United States Patent
Ikeda et al.

(10) Patent No.: US 6,759,182 B2
(45) Date of Patent: Jul. 6, 2004

(54) MANUFACTURING METHOD AND APPARATUS OF OPTICAL DEVICE AND REFLECTION PLATE PROVIDED WITH RESIN THIN FILM HAVING MICRO-ASPERITY PATTERN

(75) Inventors: Masaaki Ikeda, Kyoto (JP); Akihiro Funamoto, Kyoto (JP); Motohiko Matsushita, Kyoto (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 287 days.

(21) Appl. No.: 10/092,336

(22) Filed: Mar. 6, 2002

(65) Prior Publication Data

US 2002/0125588 A1 Sep. 12, 2002

(30) Foreign Application Priority Data

Mar. 6, 2001 (JP) ........................ 2001-062416

(51) Int. Cl.[7] ............................ G03C 5/00; B29D 11/00
(52) U.S. Cl. ............................ 430/320; 430/2; 430/302; 430/321; 430/330; 264/1.6; 264/2.2; 264/102
(58) Field of Search .......................... 430/320, 2, 302, 430/330, 321, 322; 264/1.6, 2.2, 85, 102; 101/4

(56) References Cited

U.S. PATENT DOCUMENTS 5,071,597 A * 12/1991 D'Amato et al. .......... 264/1.34

2002/0098257 A1 * 7/2002 Ikeda et al. .................. 425/374
2002/0125588 A1 * 9/2002 Ikeda et al. .................. 264/1.6

FOREIGN PATENT DOCUMENTS

EP 0 617 310 A1 3/1994

OTHER PUBLICATIONS

Patent Abstracts of Japan, Publication No. 06–273800, Sep. 30, 1994, 2 pgs.
Patent Abstracts of Japan, Publication No. 11–052110, Feb. 26, 1999, 3 pgs.
Patent Abstracts of Japan, Publication No. 11–242105, Sep. 7, 1999, 3 pgs.
Patent Abstracts of Japan, Publication No. 2000–258615, Sep. 22, 2000, 3 pgs.

* cited by examiner

*Primary Examiner*—Thorl Chea
(74) *Attorney, Agent, or Firm*—Osha & May L.L.P.

(57) ABSTRACT

There is provided a manufacturing method of an optical device having a micro-asperity pattern that has various kinds of accurate three-dimensional shapes and is realized as thin films. A substrate is coated with a resin thin film made of a photosensitive resin, and the temperature of the resin thin film is controlled so as to be lower than the photosensitivity extinction temperature of the resin thin film. A micro-asperity pattern of a stamper is pressed against the resin thin film when the resin thin film is in a softened or melted state by pressurizing means, whereby a micro-asperity pattern is formed on the surface of the resin thin film.

8 Claims, 17 Drawing Sheets

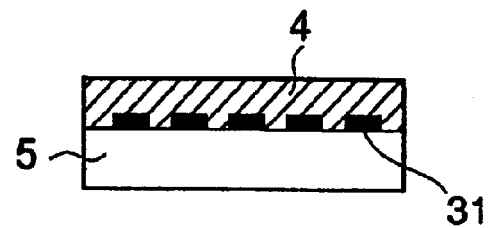
Fig.1A
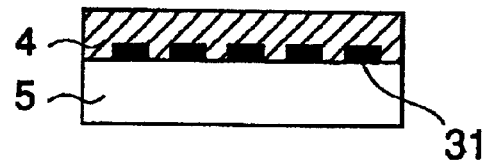
Fig.1B
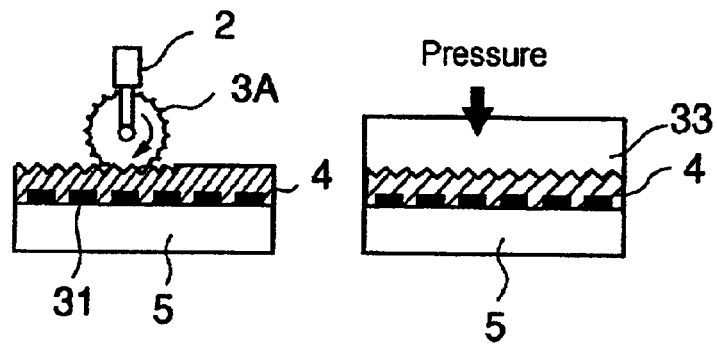
Fig.1C
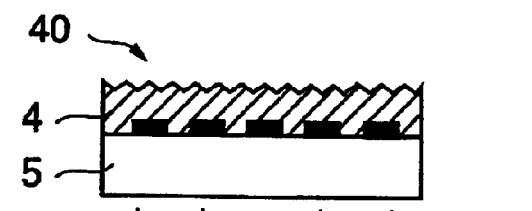
Fig.1D
Fig.1E
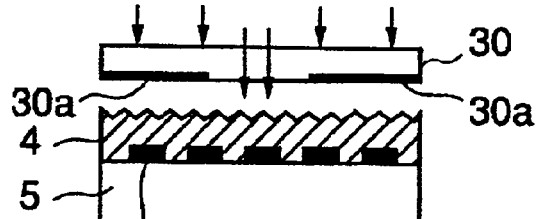
Fig.1F
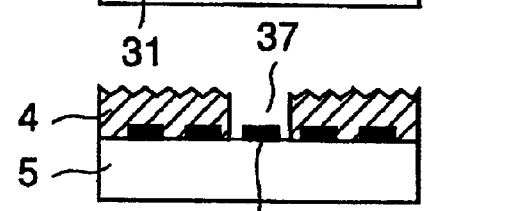
Fig.1G
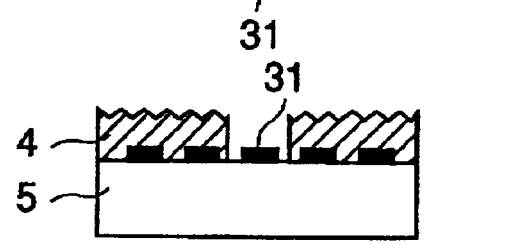

Cross-sectional view taken along A-A

US 6,759,182 B2

MANUFACTURING METHOD AND APPARATUS OF OPTICAL DEVICE AND REFLECTION PLATE PROVIDED WITH RESIN THIN FILM HAVING MICRO-ASPERITY PATTERN

BACKGROUND OF INVENTION

The present invention relates to manufacturing methods and apparatuses of an optical device and a reflection plate, that include a resin thin film having a micro-asperity pattern.

In this specification, "micro-asperity pattern" is a generic term of asperity shapes that develop one-dimensionally or two-dimensionally and are 0.1 μm to hundreds of micrometers in depth and arbitrary in width, length and shape.

"Reflection-type liquid crystal display device" is a generic term of devices in which a liquid crystal is sealed between a transparent counter substrate having a transparent electrode and an active matrix substrate having a reflection surface that is provided with a surface micro-asperity pattern.

Nowadays, liquid crystal display devices are increasingly applied to personal computers, TV receivers, word processors and video equipment, etc. On the other hand, to increase the functionality and reduce the size, power consumption, cost, etc. of such electronic equipment, reflection-type liquid crystal display devices that display an image by reflecting external light instead of using a backlight are being developed.

FIG. 17 shows an example of such reflection-type liquid crystal display devices. A reflection plate 1 used in the reflection-type liquid crystal display device is disposed under a counter substrate 28 that is composed of a transparent electrode facing a liquid crystal layer 27, a color filter layer formed over the transparent electrode, a surface glass substrate disposed over the color filter layer, and other members. The reflection plate 1 is used to increase the viewing angle of the image display of the liquid crystal display device by diffuse-reflecting light coming from the counter substrate 28.

The reflection plate used in this liquid crystal display device is formed by a melting method in which a photosensitive resin material is coated by spin coating or the like on the surface of a substrate made of glass or resin or the surface of a substrate in which TFT transistors, liquid crystal driving elements, etc. are formed on such a substrate and is patterned through photolithography to form an asperity pattern whose cross section has an almost rectangular shape. A smooth curved surface is then formed by surface tension through heat treatment.

An embossment, in which a micro-asperity pattern stamper is pressed against a resin thin film coated on a substrate, whereby a micro-asperity pattern is formed, is also known.

In the reflection-type liquid crystal display device, as shown in FIG. 18, a thin film transistor or a wiring contact 31 is disposed under a resin thin film 4 having a micro-asperity pattern 40. Thus, a contact hole 37 penetrating the resin thin film 4 needs to be formed in order to obtain electrical contact.

In case where the micro-asperity pattern 40 is formed through the conventional melting method, the contact hole is made through photolithography using a photosensitive resin. This photolithography technique is suitable for forming the contact hole because it can make a through-hole without damaging a layer disposed therebelow as does wet etching using a strong acid or alkali solution or dry etching using reactive plasma does.

However, the melting method has problems that 1) three-dimensional degree of freedom that realizes an acute-angled or plane shape is low because the method makes an application of shape sagging, 2) a shape varies with a variation in melting conditions thus resulting in low processing accuracy, and 3) a large number of processing steps increases cycle time.

On the other hand, the embossment method has a high degree of three-dimensional freedom since a stamper transfers a micro-asperity pattern to the resin thin film. And this method can attain a micro-asperity pattern with high reproducibility. Furthermore, the embossment method can use any resin material if it is melted, leaving a wide range of choices.

However, the embossment method cannot maintain photosensitivity of a photosensitive resin thin film after a micro-asperity pattern of the resin thin film is formed when the photosensitive resin thin film is spin-coated on the surface of a substrate and heated to an appropriate temperature for press-shaping the resin thin film by using a stamper. This results in extinction of the photosensitivity.

SUMMARY OF INVENTION

The present invention provides a manufacturing method and apparatus of an optical device having a micro-asperity pattern, which are able to form various kinds of three-dimensional shapes with satisfactory processing accuracy and realize them as thin films.

The invention further provides manufacturing methods and apparatuses of an optical device and a reflection plate, each of which has liquid crystal driving elements or wiring contacts that are disposed under a micro-asperity pattern and has a conducting passage leading from a reflection plate placed on the top surface of the micro-asperity pattern to the liquid crystal driving elements or the wiring contacts.

The invention provides a manufacturing method of an optical comprising: coating a substrate 5 with a resin thin film 4 made of a photosensitive resin; controlling a temperature of the resin thin film 4 to a temperature that is lower than the photosensitivity extinction temperature so as to soften or melt the resin thin film 4; and pressing a die having an inverted micro-asperity pattern against the resin thin film 4 in a state that the resin thin film 4 has been softened or melted, whereby a micro-asperity pattern is formed on a surface of the resin thin film 4.

In this manufacturing method, the die has a member or portion having an inverted shape of that of at least a micro-asperity pattern to be formed on the surface of a resin thin film, and may be either a press male die or a roller-type die.

The optical device means an element whose surface is formed with at least a micro-asperity pattern to perform diffusion, focusing and reflection of light.

In this manufacturing method, the micro-asperity pattern surface of the die is pressed against the resin thin film, whereby a micro-asperity pattern is formed on the surface of the resin thin film. Therefore, the micro-asperity pattern that is left on the resin thin film is given an arbitrary three-dimensional shape. That is, a micro-asperity pattern can be obtained with a high degree of freedom and high reproducibility.

Since the temperature of the resin thin film formed on the substrate is controlled to a temperature that is lower than the photosensitivity extinction temperature of the resin thin film, it is possible to form a through-hole in the resin thin film or easily cut the shape of the resin thin film into an appropriate shape by photolithography, if required, after the temperature is controlled.

The micro-asperity pattern can be laid out regularly or arbitrarily by executing the die pressing step a number of times on the resin thin film.

In the invention, it is an effective measure to make adjustments by causing a relative movement between the substrate and the die so that a substrate-side alignment mark provided on the substrate coincides with a reference position on the die side. Using this technical measure, an error in the position of the substrate with respect to the die can be corrected by causing a relative movement between the substrate and the die so that the substrate-side alignment mark provided on the substrate coincides with the reference position on the die side. As a result, a micro-asperity pattern can be formed with high processing accuracy.

In the invention, it is also an effective measure to form a micro-asperity pattern on the surface of the resin thin film at an inert gas atmosphere or a low-pressure atmosphere having a pressure that is lower than atmospheric pressure. Using this technical measure, the air is exhausted in advance from a chamber that accommodates the manufacturing device for manufacturing an optical device. Therefore, oxygen and impurities contained in the air inside the chamber are exhausted and a micro-asperity pattern can be formed in a clean, inert gas atmosphere. This makes it possible to not only prevent the resin thin film from being oxidized or changed in quality but also prevent the phenomenon where impurities stick to the resin thin film during formation of a micro-asperity pattern and are finally fixed to the micro-asperity pattern formed, whereby the production yield of the optical device can be increased.

Particularly, when the pressure inside the chamber is lowered, air is no longer trapped between the die and the resin thin film and a micro-asperity pattern that is free of air bubbles can be formed. If air bubbles existed, they would act as a damper and hence necessitate stronger pressing force. Without air bubbles, the pressing force can be made weaker, as a result of which residual stress in a micro-asperity pattern formed decreases. Therefore, the production yield of the optical device can be increased.

The resin thin film may be of a polyimide (PI) type or acryl type. Polyimide (PI) has thermoplasticity. It is desirable that the polyimide-type resin be fully aromatic polyimide such as polyetherimide (PEI) or polyamideimide (PAI).

In case of the PI-type resin and acryl-type resin, the photosensitivity extinction temperature is about 100–150° C. The temperature of the resin thin film when it is pressed is set lower than the photosensitivity extinction temperature. Since the photosensitivity is varied as a heating temperature of the heating means is changed, it is desirable that the press temperature be set at photosensitivity extinction temperature minus 10° C.

According to another aspect of the invention, there is provided a manufacturing apparatus of an optical device, comprising a transfer stage disposed under a die having an inverted micro-asperity pattern, for holding a substrate that is coated with a resin thin film; a transfer stage transfer direction moving mechanism for reciprocating the transfer stage between an initial position and a movement end position where a movement that starts from the initial position ends; and a pressurizing mechanism for pressing the die against the resin thin film at a prescribed position, wherein a micro-asperity pattern is formed on a surface of the resin thin film by pressing the die against the resin thin film with the pressurizing mechanism.

The transfer stage transfer direction moving mechanism is a mechanism for moving the transfer stage that holds the substrate rightward from the initial position to the movement end position (it is assumed that the initial position is located on the left side) while a micro-asperity pattern is formed on the resin thin film, and for returning the transfer stage from the movement end position to the initial position. As mentioned above, the die may be either a press male die or a roller-type die.

In this manufacturing apparatus, the die is pressed against the resin thin film while the substrate on the transfer stage is moved from the initial position to the movement end position, whereby a micro-asperity pattern is formed. Therefore, an optical device having a micro-asperity pattern that has been formed with high processing accuracy can be provided.

The invention also provides a manufacturing apparatus of an optical device, comprising a transfer stage disposed under a die having an inverted micro-asperity pattern, for holding a substrate that is coated with a resin thin film; a pressurizing mechanism for pressing the die against the resin thin film at a prescribed position; and a pressurizing mechanism transfer direction moving mechanism for reciprocating the pressurizing mechanism between an initial position and a movement end position where a movement that starts from the initial position ends, wherein a micro-asperity pattern is formed on a surface of the resin thin film by pressing the die against the resin thin film with the pressurizing mechanism.

The pressurizing mechanism transfer direction moving mechanism is a mechanism for moving the pressurizing mechanism on the resin thin film rightward from the initial position to the movement end position (it is assumed that the initial position is located on the left side), while a micro-asperity pattern is formed on the resin thin film, and for returning the pressurizing mechanism from the movement end position to the initial position. As mentioned above, the die may be either a press male die or a roller-type die.

In this manufacturing apparatus, the die is pressed against the resin thin film while the pressurizing mechanism is moved from the initial position to the movement end position, whereby a micro-asperity pattern is formed. Therefore, an optical device having a micro-asperity pattern that has been formed with high processing accuracy is provided.

It is desirable that the apparatus be configured in such a manner that the substrate is disposed under the die so as to be able to move in an X-direction and a Y-direction and rotate about a Z-axis that points to the die, whereby a position of the substrate can be adjusted with respect to the die. Using this technical measure, since the substrate can be moved in the X-axis and the Y-axis with respect to the die and can be rotated about the Z-axis, the position of the substrate with respect to the die can be adjusted. Therefore, an optical device that has been manufactured with high processing accuracy can be provided.

In the invention, it is an effective measure to give the die a cylindrical shape in which the outer circumferential surface is formed with the inverted micro-asperity pattern, and to form a micro-asperity pattern on the surface of the resin thin film as the die rolls on the surface of the resin thin film 4 while being pressed against the resin thin film.

With this technical measure, a micro-asperity pattern is formed as the cylindrical die whose outer circumferential surface is formed with the inverted micro-asperity pattern is pressed against the resin thin film. Therefore, even if air bubbles exist inside the resin thin film, they are pushed and moved by the recesses of the inverted micro-asperity pattern of the die in the direction opposite to the movement direction of the resin thin film (in the case where the resin thin film is moving) or the movement direction of the die (in the case where the die is moving) and are broken by the projections of inverted micro-asperity pattern, whereupon the air goes out of the resin thin film. This reduces the probability of a phenomenon where a micro-asperity pattern produced is deformed by air bubbles that remain inside the resin thin film, and as a result, the yield is increased.

In the invention, it is an effective measure to employ a transfer stage crossing direction moving mechanism for moving the transfer stage in a crossing direction that crosses a micro-asperity pattern transfer direction, whereby a relative movement can be caused between the resin thin film and the die in both the micro-asperity pattern transfer direction and the crossing direction.

A micro-asperity pattern is transferred to the resin thin film by means of the die. If the position of the substrate that is provided on the transfer stage is deviated from the reference position of the die, a micro-asperity pattern is not formed at a prescribed position. It is therefore necessary to move the transfer stage perpendicularly to the die movement direction. The transfer stage crossing direction moving mechanism is provided for this purpose. Although it is desirable to move the transfer stage completely perpendicularly to the micro-asperity pattern transfer direction, high-level techniques are needed to do so because of manufacturing errors. The transfer stage need not always be moved completely perpendicular to the micro-asperity pattern transfer direction.

Using this technical measure, the initial position of the substrate that is held by the transfer stage can be adjusted by causing a relative movement between the transfer stage and the die in the micro-asperity pattern transfer direction and the crossing direction by using the transfer stage crossing direction moving mechanism and the transfer stage transfer direction moving mechanism for reciprocating the transfer stage between the initial position and the movement end position or the pressurizing mechanism transfer direction moving mechanism for reciprocating the pressurizing mechanism between the initial position and the movement end position. Another mode of operation is possible that after a first micro-asperity pattern is formed by the die, the transfer stage is moved by the transfer stage crossing direction moving mechanism and a second micro-asperity pattern is formed beside the first one.

In the invention, it is an effective measure that the die comprise a stamper to be pressed against the resin thin film to form a micro-asperity pattern on its surface, a base for holding the stamper, and an elastic member interposed between the stamper and the base.

With this technical measure, the elastic member absorbs manufacturing errors such as undulation in the stamper and the base, whereby the micro-asperity pattern processing accuracy can be increased.

It is also effective that the die comprise a stamper to be pressed against the resin thin film to form a micro-asperity pattern on its surface, a roll body for holding rotatably the stamper, and an elastic member interposed between the stamper and the roll body.

Using this technical measure, the elastic member absorbs manufacturing errors such as undulation in the stamper and the roll body, whereby micro-asperity pattern processing accuracy can be increased.

In the invention, it is effective that the apparatus have heating units for heating the die and the transfer stage, and a temperature controller for controlling the heating units. Using this technical measure, the cycle time of a manufacturing process can be made constant and an optical device having a micro-asperity pattern that has been formed with high processing accuracy can be provided.

In the invention, it is effective that the pressurizing mechanism comprise at least one alignment mark observation optical device so that at least one alignment mark provided on the substrate can be recognized visually. It is also an effective measure to employ at least one alignment mark observation optical device that is disposed under the substrate so that at least one pair of a first alignment mark provided on the substrate and a second alignment mark provided on the die can be recognized visually. As long as the alignment mark observation optical device is disposed under the substrate, it may be provided inside the transfer stage or the above-mentioned rotation moving mechanism or may bridge the transfer stage and the rotation moving mechanism. This technical measure makes it possible to form a micro-asperity pattern having high position accuracy.

The invention also provides a manufacturing apparatus of an optical device, comprising a transfer stage for holding a substrate that is coated with a resin thin film; a pressuring mechanism for pressing a die having an inverted micro-asperity pattern against the resin thin film at a prescribed position; a moving mechanism for moving one of the transfer stage and the die while the die is pressed against the resin thin film; and an airtight chamber having an exhaust mechanism, the airtight chamber accommodating the transfer stage, the die, the pressurizing mechanism, and the moving mechanism, wherein the exhaust mechanism exhausts a gas from the airtight chamber prior to an operation that a micro-asperity pattern is formed on a surface of the resin thin film by pressing the die against the resin thin film.

In this manufacturing apparatus, the exhaust mechanism for exhausting a gas from the airtight chamber is used prior to an operation that a micro-asperity pattern is formed on the surface of the resin thin film by pressing the die against the resin thin film. Therefore, oxygen and impurities contained in the air inside the airtight chamber are exhausted and a micro-asperity pattern can be formed in a clean, inert gas atmosphere. This makes it possible to not only prevent the resin thin film from being oxidized or changed in quality but also prevent a phenomenon that impurities stick to the resin thin film during formation of a micro-asperity pattern and are finally fixed to the micro-asperity pattern formed, whereby the production yield of an optical device can be increased.

According to another aspect of the invention, there is provided a manufacturing method of an optical device, comprising the steps of coating a substrate with a photosensitive resin thin film; controlling a temperature of the resin thin film to a temperature that is lower than the photosensitivity extinction temperature of the resin thin film, so as to soften or melt the resin thin film; pressing a die having an inverted micro-asperity pattern against the resin thin film in a state that the resin thin film has been softened or melted, whereby the micro-asperity pattern is formed on a surface of the resin thin film; forming a through-hole leading from the surface of the micro-asperity pattern to the surface of the substrate by photolithography; and sintering the resin thin film at a temperature that is higher than the photosensitivity extinction temperature of the resin thin film.

In this manufacturing method, the micro-asperity pattern surface of the die is pressed against the resin thin film, whereby a micro-asperity pattern is formed on the surface of the resin thin film. Therefore, the micro-asperity pattern that is left on the resin thin film is given an arbitrary three-dimensional shape. That is, a micro-asperity pattern can be obtained with a high degree of freedom and high reproducibility.

Since the temperature of the resin thin film coated on the substrate is controlled to a temperature lower than the photosensitivity extinction of the resin thin film, a through-hole can be easily formed when it is opened in the resin thin film by photolithography.

Although a sintering temperature is set higher than the photosensitivity extinction temperature, it is desirable that the sintering temperature be set higher than 200° C. in order to avoid generation of gas caused by decomposition of a volatile remaining photosensitive component of a residual solvent in the resin thin film. Therefore, an alignment film made of polyimide resin can be sintered at 200° C. after the micro-asperity pattern of the resin thin film is formed.

It is also desirable that the glass transition temperature of the photosensitive resin be at least 200° C. after sintering in order to prevent the micro-asperity pattern from losing its shape during the sintering.

The invention also provides a manufacturing method of a reflection plate, comprising the steps of coating a substrate on which thin-film liquid crystal driving elements or wiring contacts are formed with a photosensitive resin thin film; controlling a temperature of the resin thin film to a temperature that is lower than the photosensitivity extinction temperature of the resin thin film, so as to soften or melt the resin thin film; pressing a die having an inverted micro-asperity pattern against the resin thin film in a state that the resin thin film has been softened or melted, whereby the micro-asperity pattern is formed on a surface of the resin thin film; forming a through-hole leading from the surface of the micro-asperity pattern to the thin-film liquid crystal driving elements or wiring contacts by photolithography; forming a reflection film on the inner surface of the through-hole and the surface of the micro-asperity pattern; and sintering the resin thin film at a temperature that is higher than the photosensitivity extinction temperature of the resin thin film.

In this manufacturing method, the photosensitive resin thin film is formed on the substrate on which the thin-film liquid crystal driving devices or wiring contacts are formed in advance and the temperature of the resin thin film is controlled so as to be lower than the photosensitivity extinction temperature, whereby the micro-asperity pattern is press-formed on the resin thin film by the die in a state that the resin thin film has been melted. Therefore, the resin thin film does not lose its photosensitivity caused by photolithography.

In this manufacturing method, the through-hole is formed from the micro-asperity pattern surface to the thin-film liquid crystal driving device or wiring contact, the reflection film made of a metal material is formed on the micro-asperity pattern surface including the inner surface of the through-hole, and then the resin thin film is sintered at a temperature higher than the photosensitivity extinction temperature. Accordingly, the micro-asperity pattern is not subjected to high-temperature sintering before the reflection film is formed. Therefore, the reflection plate having the micro-asperity pattern can be easily manufactured without losing the photosensitivity of the resin thin film.

BRIEF DESCRIPTION OF DRAWINGS

FIGS. 1A–1G illustrate micro-asperity pattern forming methods according to embodiments of the invention for forming a micro-asperity pattern on a resin thin film;

DETAILED DESCRIPTION

Figure 2:
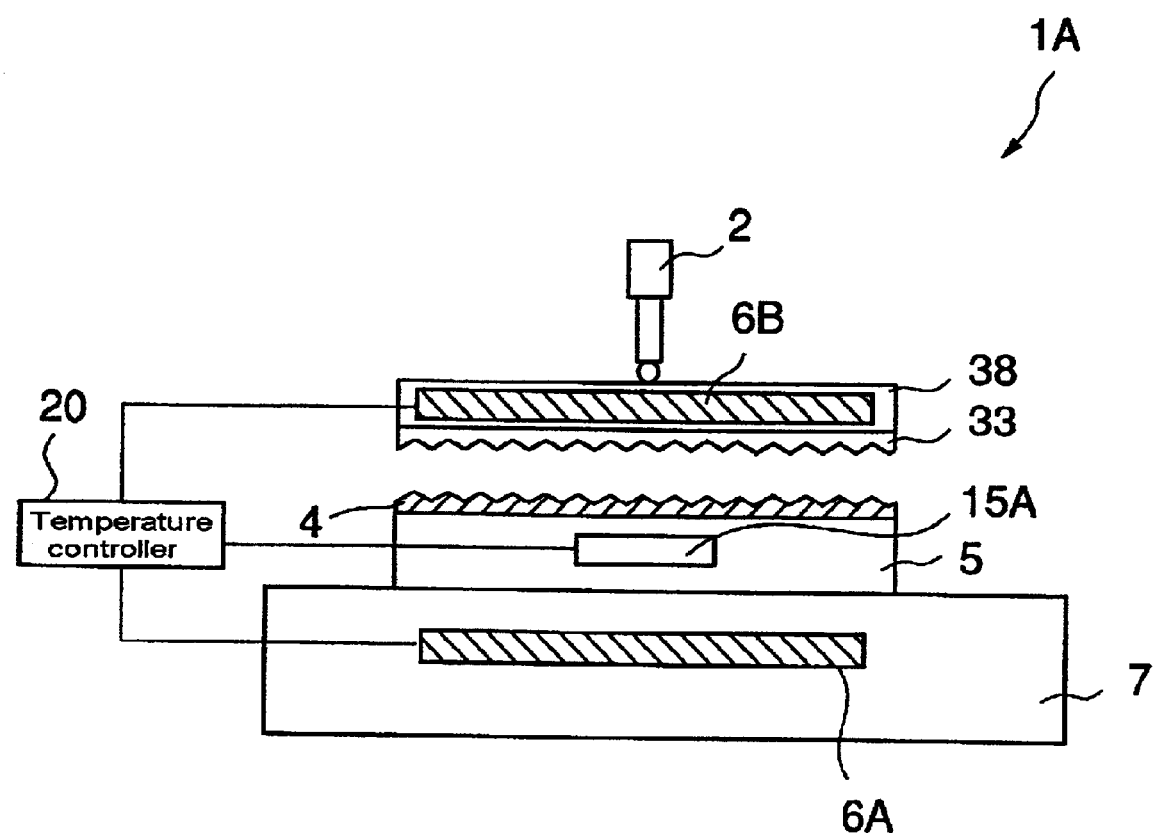
FIG. 2 illustrates the main part of a micro-asperity pattern forming apparatus according to a first embodiment of the invention for forming a micro-asperity pattern on a resin thin film.

Preferred embodiments of the present invention will be hereinafter described in detail with reference to the accompanying drawings. The dimensions, materials. Shapes, relative arrangements, etc. of components used in the embodiments are just examples and are not intended to restrict the scope of the invention unless there is a specific statement to the contrary.

FIGS. 1A–1G illustrate micro-asperity pattern forming methods according to embodiments of the invention for forming a micro-asperity pattern on a resin thin film. As shown in FIG. 1A, liquid crystal driving elements (TFTs) or wiring contacts 31 are already formed on a glass substrate 5. The wiring contacts 31 were formed by repeating steps of: forming a metal film on the glass substrate 5 by sputtering, coating the metal film with a resist by spin coating, baking the resist at a high temperature to harden it, exposing the resist to ultraviolet light through a proper mask, removing exposed portions of the resist with a developer, again baking the resist at a high temperature, etching away uncovered portions of the metal film, and removing the remaining portions of the resist with a remover.

As shown in FIG. 1A, a resin thin film 4 of a photosensitive resin such as acryl is formed on the glass substrate 5 by spin coating. Then, heating is performed, whereby the resin thin film 4 is softened while an unnecessary solvent is volatilized, as shown in FIG. 1B. In this state, as shown in FIG. 1C, a stamper 33 is pressed against the soft resin thin film 4 from above or an embossment roll 3A is rolled while being pressed against the soft resin thin film 4 from above. Then, the resin thin film 4 is cooled. As shown in FIG. 1D, the stamper 33 is removed to leave, on the surface of the resin thin film 4, a transferred micro-asperity pattern 40 which is an inverted pattern of the pattern of the stamper 33.

As shown in FIG. 1E, ultraviolet light is incident on the resin thin film 4 with unnecessary portions (30a) of a transparent member 30 placed above the resin thin film 4 being masked, and then development is carried out, as shown in FIG. 1F, whereby a portion of the resin thin film 4, which was exposed to the ultraviolet rays, is removed to expose a contact 31 through a contact hole 37. Thereafter, as shown in FIG. 1G, baking is performed at about 200° C., to extinguish the photosensitivity of the resin thin film, to reduce generation of gases due to volatilization of the solvent or decomposition of photosensitive components and to stabilize the quality of the micro-asperity pattern 40.

Preferably, acryl resin(product #NN777) produced by JSR Co., Ltd., is used as the photosensitive resin, which has a photosensitivity extinction starting temperature of about 100° C. and a solvent volatilization temperature and a heating temperature during embossment of 90° C.

After the embossment and photolithography are performed, sintering at approximately 200° C. is performed to stabilize the rein thin film through polymerization reaction.

In this embodiment, after the resin thin film 4 is coated on the surface of the substrate 5, the resin thin film is heated at the solvent volatilization temperature of 90° C. that is higher than room temperature of 30° and the stamper is pressed against the resin thin film to form a micro-asperity pattern on the resin thin film while the solvent is volatilized. Then, the temperature is lowered to the room temperature, whereby the micro-asperity pattern is accomplished. Photolithography is carried out at a temperature lower than the photosensitivity extinction starting temperature of 100° C., and then sintering is performed at 200° C.

Figure 18:
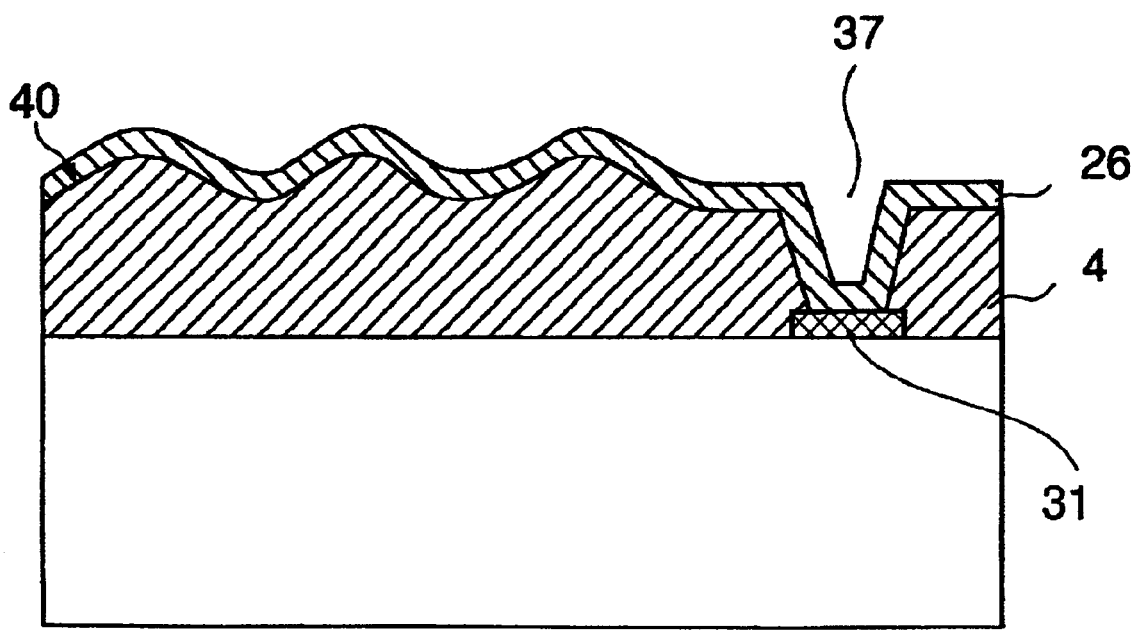
FIG. 18 illustrates a conducting passage between a conductor part of a reflection plate asperity pattern and a conductor part of a substrate.

As shown in FIG. 18, a metal thin film made of Ag or Al is deposited on the micro-asperity pattern 40 of the resin thin film 4 by sputtering, whereby a reflection film 26 is formed. By doing so, a reflection plate 1 is fabricated.

FIG. 2 illustrates the main part of a micro-asperity pattern forming apparatus 1A according to a first embodiment of the invention for forming a micro-asperity pattern on a resin thin film.

In FIG. 2, an opaque or transparent substrate 5 made of ceramics, glass, plastics, aluminum, silicon, molybdenum, or the like, and polished on both sides, has prescribed levels of undulation, warping, and flatness. Warping of several centimeters or less is allowable.

For example, warping is less than 400 μm in the case of a substrate measuring 550×650 mm. Undulation is set to be less than 4 μm or less, and flatness is set to be less than tens of nanometers.

A resin thin film 4 made of acrylic resin (PMMA), polyimide (PI), polyamideimide (PAI), polyetherimide (PEI), or the like is formed on the substrate 5 at a thickness of about 0.1–100 μm by spin coating. A stamper 33, which is disposed above the resin thin film 4, is made of a metal material such as Ni, Al, SUS, or Cu, ceramics, glass, silicon, resin, or the like. The stamper 33 may be produced by forming an asperity pattern on the surface of a plate member by direct carving, etching, printing, or the like.

The stamper 33 is fixed to a base 38, and a heater unit 6B is provided inside the base 38 in such a manner as to be able to heat the stamper 33 over approximately the entire area of the micro-asperity pattern. Temperature sensors 15A are positioned around the substrate 5. It is preferable that a plurality of temperature sensors 15A be disposed around the substrate 5 and control be made on an average value of temperatures at the locations of the respective temperature sensors 15A. The material of the resin thin film 4 is not limited to the ones mentioned above; for example, a novolac resin and a phenol resin may be used.

The stamper 33 for press-shaping the resin thin film 4 is held by a pressurizing mechanism 2. The apparatus is configured so that the pressuring mechanism 2 can produce pressure of several to thousands of megapascals. The pressurizing mechanism 2 produces pressure using a hydraulic mechanism. Alternatively, a pneumatic mechanism, reaction force of a high-elasticity spring, restoring force of a shape memory alloy, or the like may be used.

The substrate 5 is vacuum-absorbed on a transfer stage 7. Alternatively, the substrate 5 may be held by electrostatic absorption or by some other holding means. A heater unit 6A is provided inside the transfer stage 7 in such a manner as to be able to heat approximately the entire area of the substrate 5. The system is configured in such a manner that the temperatures of the heater units 6A and 6B can be controlled to prescribed values by a temperature controller 20 based on temperature information supplied from the temperature sensors 15A that are provided around the substrate 5.

In the apparatus according to the first embodiment that is configured as described above, the asperity pattern of the stamper 33 is pressed against the resin thin film 4 by the pressurizing mechanism 2 in the state that the substrate 5 is held by the transfer stage 7, whereby a micro-asperity pattern is formed on the top surface of the resin thin film 4.

In the first embodiment of the invention, since the temperature of the resin thin film 4 is controlled based on temperature information supplied from the temperature sensors 15A that are provided around the substrate 5, optical device products having accurate micro-asperity pattern can be manufactured.

Figure 3:
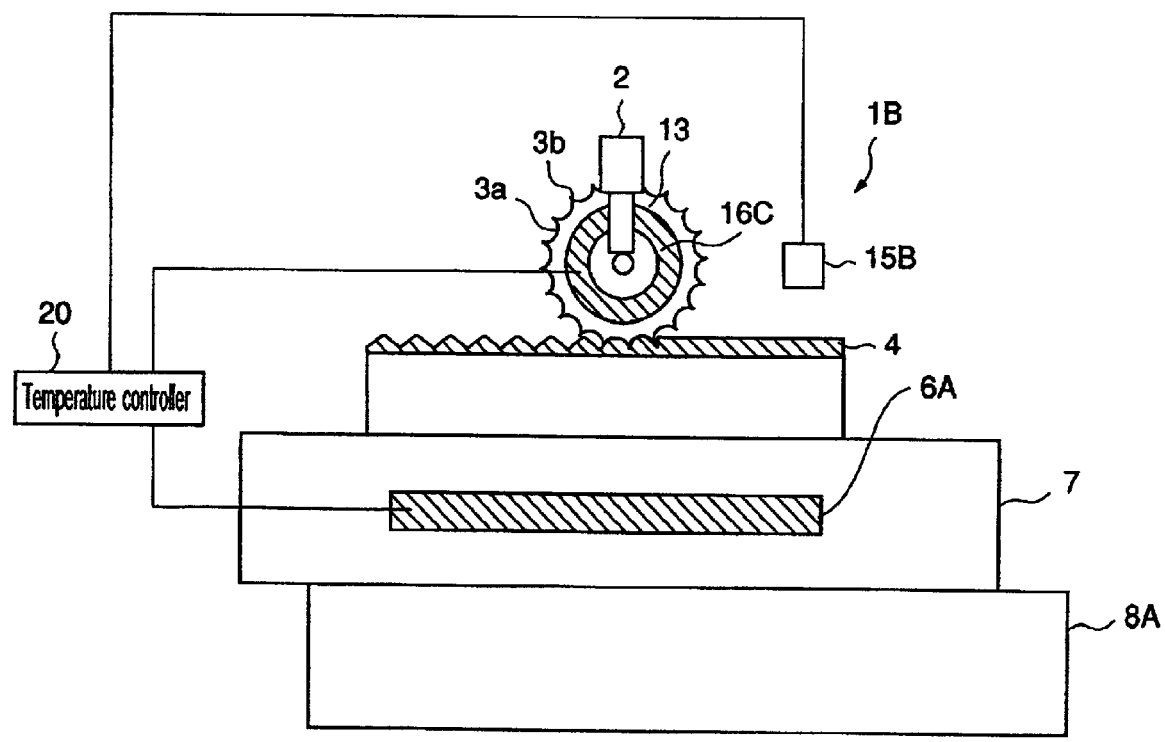
FIG. 3 illustrates the main part of a micro-asperity pattern forming apparatus according to a second embodiment of the invention for forming a micro-asperity pattern on a resin thin film.

FIG. 3 illustrates the main part of a micro-asperity pattern forming apparatus 1B according to a second embodiment of the invention for forming a micro-asperity pattern on a resin thin film. The apparatus of FIG. 3 is different from the apparatus of FIG. 2 in that heater units 16C and 6A are provided inside a cylindrical embossment roll member 13 and the transfer stage 7, respectively, and can be controlled by a temperature controller 20, whereby the resin thin film 4 is heated while the embossment roll member 13 is pressed against it.

In the second embodiment of the invention, the heater unit 16C is provided inside the embossment roll member 13 so as to be able to heat the embossment roll member 13 from inside and the heater unit 6A is provided inside the transfer stage 7. The heater units 16C and 6A are controlled by the temperature controller 20 based the temperature detected by a temperature sensor 15B. The heaters of the heater units 16C and 6A may be a heating wire heater, a high-power lamp, a ceramic heater, or the like.

Control is made so that the heater units 16C and 6A provide a uniform temperature distribution to the resin thin film 4.

Although not shown in FIG. 3, heat insulating materials for heat insulation from the heater units 16C and 6A are used in the transfer stage 7, the embossment roll member 13, the pressurizing mechanism 2, and a moving mechanism 8A and a cooling mechanism of a water-cooling type, an air-cooling type, or the like is also provided.

In the second embodiment, the embossment roll member 13 (specifically, its recesses 3a) is pressed against the surface of the resin thin film 4. Therefore, even if air bubbles exist inside the resin thin film 4, they are pushed and moved by the recesses 3a of the embossment roll 13 in the direction opposite to the movement direction of the resin thin film 4 and are broken by projections 3b of the embossment roll 13, whereupon the air escapes from the resin thin film 4. This reduces the probability of a phenomenon that resulted micro-asperity pattern 40 is deformed by air bubbles.

Figure 4:
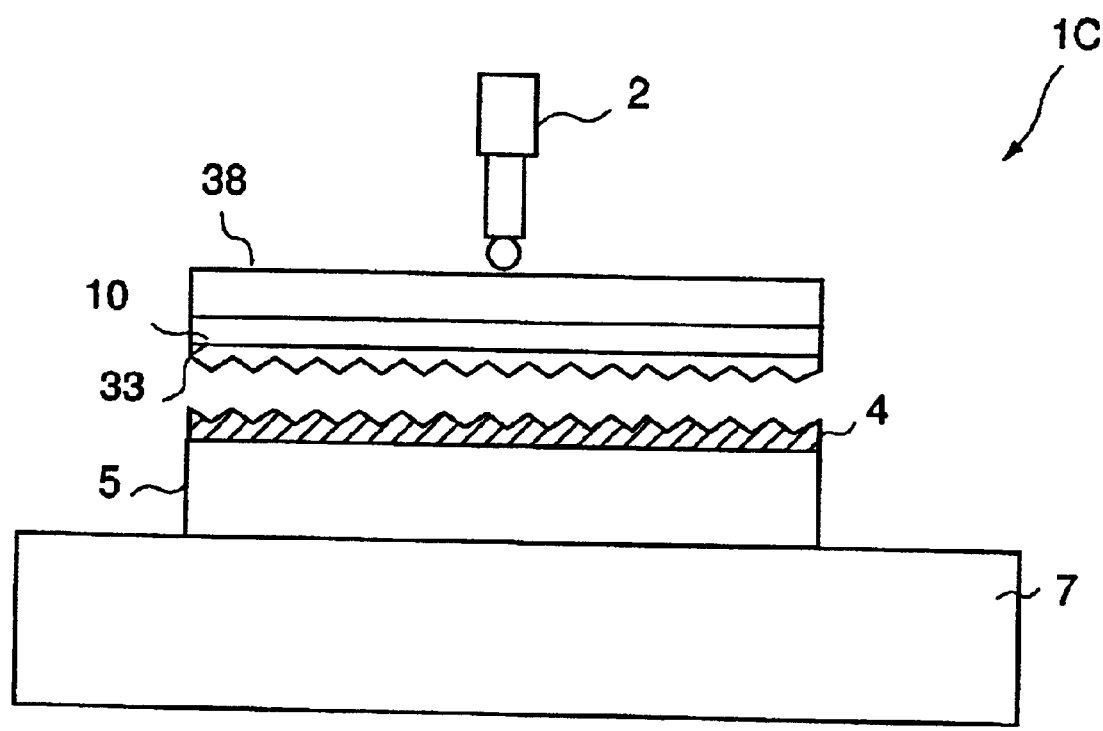
FIG. 4 illustrates the main part of a micro-asperity pattern forming apparatus according to a third embodiment of the invention for forming a micro-asperity pattern on a resin thin film.

FIG. 4 illustrates the main part of a micro-asperity pattern forming apparatus 1C according to a third embodiment of the invention for forming a micro-asperity pattern on a resin thin film. The apparatus in FIG. 4 is different from the apparatus in FIG. 2 in that in the former apparatus an elastic body 10 made of synthetic rubber, a rectangular metal sheet, or a combination thereof is interposed between the base 38 and the stamper 33. This apparatus can manufacture optical device products having accurate dimensions by absorbing manufacturing errors such as undulation, if any, of the base 38, the stamper 33, etc.

Heater units 6A and 6B are omitted for convenience of explanation.

Figure 5A:
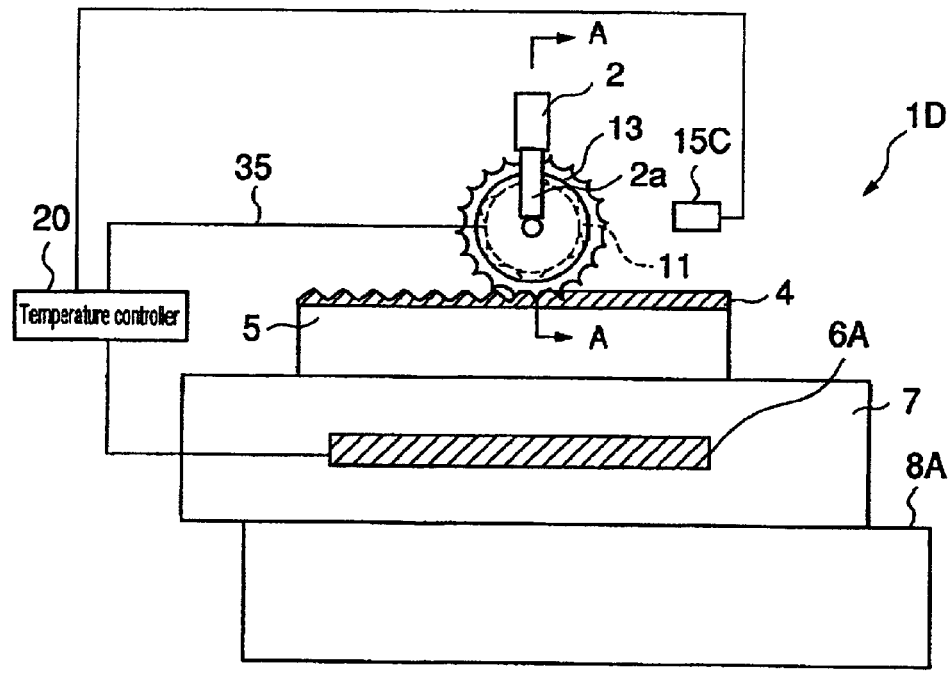
FIGS. 5A and 5B illustrate the main part of a micro-asperity pattern forming apparatus according to a fourth embodiment of the invention for forming a micro-asperity pattern on a resin thin film.
Figure 5B:
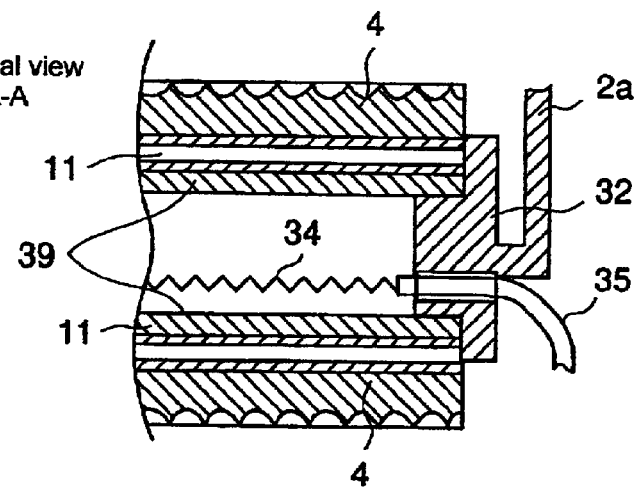

FIGS. 5A and 5B illustrate the main part of a micro-asperity pattern forming apparatus 1D according to a fourth embodiment of the invention for forming a micro-asperity pattern on a resin thin film. The apparatus of FIGS. 5A and 5B is different from the apparatus of FIG. 3 (second embodiment) in the structure of the embossment roll. Specifically, in this embodiment, a roll end 32 is provided to engage the pressurizing mechanism 2 and holds both ends of a cylindrical roll boy 39, and a heater 34 is provided inside the roll body 39. A wire 35 is connected between the heater 34 and the temperature controller 20. An elastic member that is a thin plate 11 made of metal or resin is interposed between the roll body 39 and an embossment roll member 13.

According to this embodiment, since the elastic member is interposed between the roll body 39 and the embossment roll member 13, manufacturing errors such as undulation, if any, of the embossment roll member 13, the roll body 39, etc. are absorbed, whereby optical device products having accurate dimensions can be manufactured.

Figure 6:
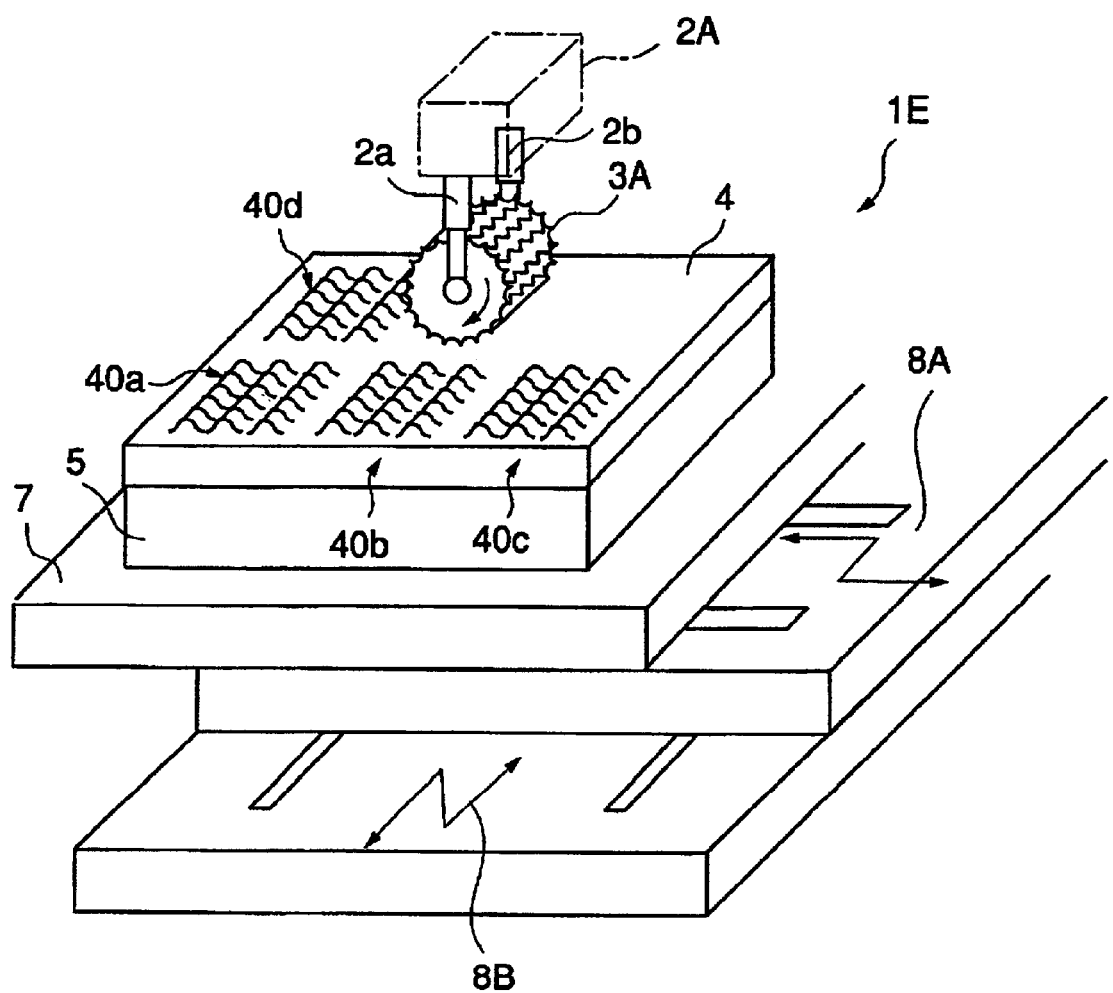
FIG. 6 illustrates the main part of a micro-asperity pattern forming apparatus according to a fifth embodiment of the invention for forming a micro-asperity pattern on a resin thin film.

FIG. 6 illustrates the main part of a micro-asperity pattern forming apparatus 1E according to a fifth embodiment of the invention for forming an asperity pattern on a resin thin film. The fifth embodiment of FIG. 6 is different from the second embodiment of FIG. 3 in that the pressurizing mechanism 2A which holds the embossment roll 3A with arms 2a and 2b is configured so as to be movable in the vertical direction while applying pressure to the resin thin film 4, and in that a moving mechanism 8A is placed on an embossment-roll-rotation-axis-direction moving mechanism 8B so as to be movable in the embossment roll rotation axis direction. Heater units 6A and 16C are omitted for convenience of explanation.

In the apparatus according to the fifth embodiment, which is configured as described above, micro-asperity patterns having desired lengths can be formed at desired intervals as exemplified by micro-asperity patterns 40a–40d in FIG. 6 by moving the pressurizing mechanism 2A in the vertical direction during movement of the transfer stage 7. Therefore, micro-asperity patterns can be arranged either regularly or arbitrarily.

Figure 7:
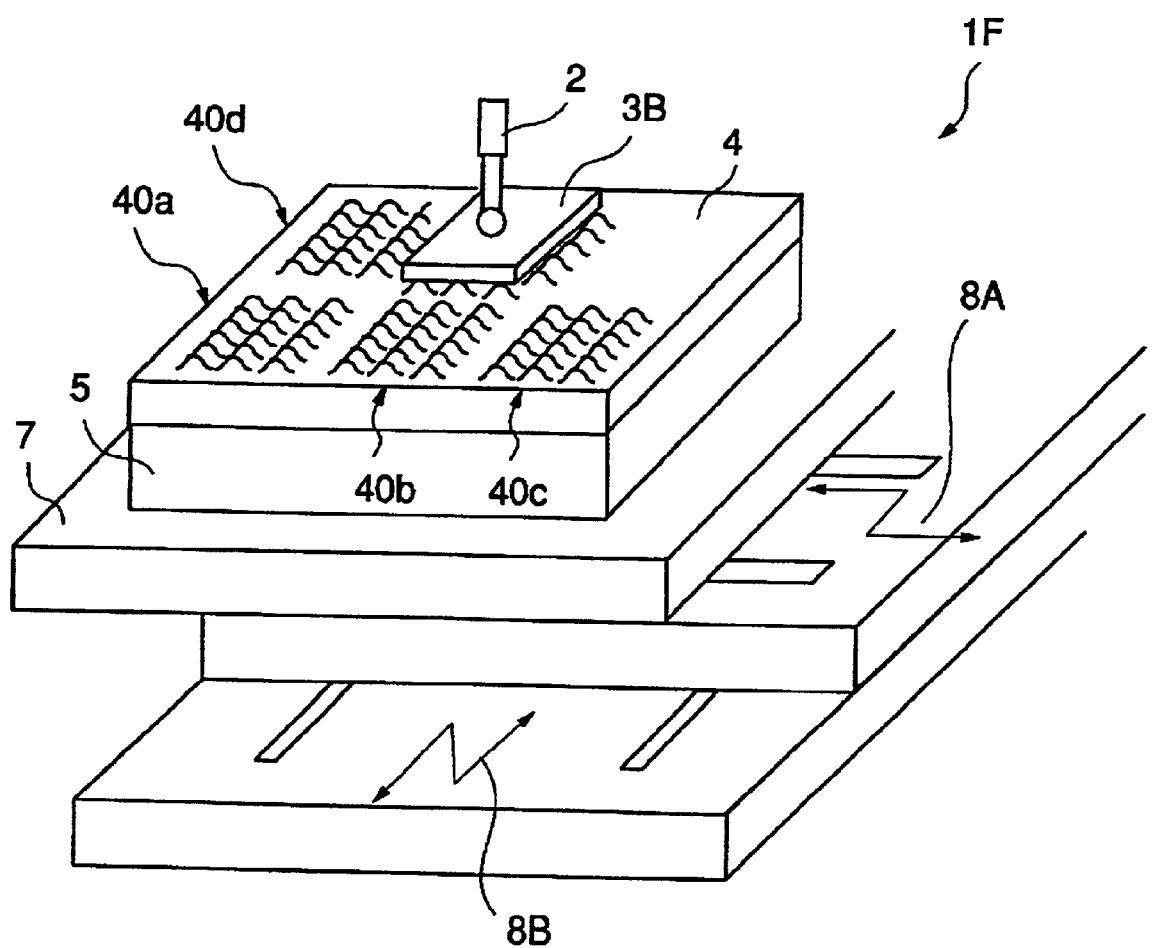
FIG. 7 illustrates the main part of a micro-asperity pattern forming apparatus according to a sixth embodiment of the invention for forming a micro-asperity pattern on a resin thin film.

FIG. 7 illustrates the main part of a micro-asperity pattern forming apparatus 1F according to a sixth embodiment for forming a micro-asperity pattern on a resin thin film. The sixth embodiment of FIG. 7 is different from the fourth embodiment of FIG. 5 in that a stamper 3B that is pressed against the resin thin film 4 is held by the pressurizing mechanism 2, and in that the apparatus is configured so that the pressurizing mechanism 2 can produce pressure of several to thousands of megapascals. The pressurizing mechanism 2 is configured as to be movable in the vertical direction. Heater units 6A and 16C are omitted for convenience of explanation.

In the apparatus according to the sixth embodiment that is configured as described above, the asperity pattern of the stamper 3B is pressed against the resin thin film 4 by the pressurizing mechanism 2 in the state that the substrate 5 is held by the transfer stage 7, whereby micro-asperity patterns 40 are formed on the top surface of the resin thin film 4.

In the sixth embodiment, micro-asperity patterns having desired lengths can be formed at desired intervals as exemplified by the micro-asperity patterns 40a-40d in FIG. 7 by moving the pressurizing mechanism 2 in the vertical direction during movement of the transfer stage 7. Therefore, micro-asperity patterns can be arranged either regularly or arbitrarily.

Figure 8:
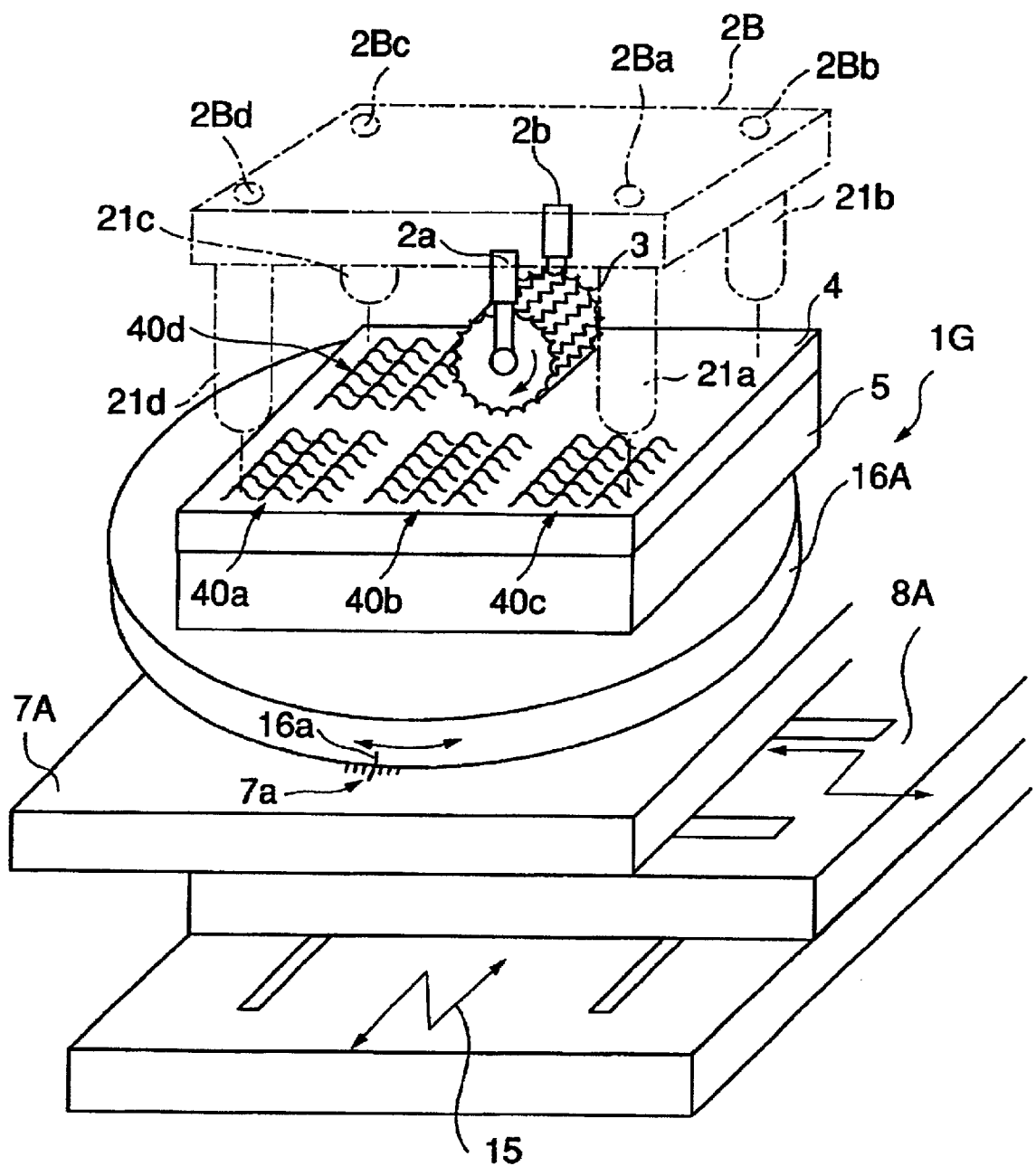
FIG. 8 illustrates the main part of a micro-asperity pattern forming apparatus according to a seventh embodiment of the invention for forming a micro-asperity pattern on a resin thin film.

FIG. 8 illustrates the main part of a micro-asperity pattern forming apparatus 1G according to a seventh embodiment for forming an asperity pattern on a resin thin film, which is an improved version of the apparatus of FIG. 6. The seventh embodiment of FIG. 8 is different from the fifth embodiment of FIG. 6 in that a substrate rotation direction adjustment mechanism 16A is interposed between a transfer stage 7A and the substrate 5, and in that a pressurizing mechanism 2B is provided that has alignment mark observation optical devices 21(21a–21d) capable of reading alignment marks on the substrate 5 or the resin thin film 4.

The substrate 5 is vacuum-absorbed on the substrate rotation direction adjustment mechanism 16A. Alternatively, the substrate 5 may be held by electrostatic absorption or by some other holding means. The substrate rotation direction adjustment mechanism 16A is held by the transfer stage 7A rotatably. Fixing the mechanism 16A to the transfer stage 7A and releasing the mechanism 16A from the transfer stage 7A in order to make it rotatable can be performed by manipulating a manipulation lever that is disposed at a position not shown in FIG. 8.

A fine adjustment dial is disposed at a position not shown in FIG. 8. The apparatus is so configured that the substrate rotation direction adjustment mechanism 16A can be rotated in a manner of manipulating the fine adjustment dial. An index 16a that is provided on the mechanism 16A and movement distance marks 7a that are provided on the transfer stage 7A provide a rough measure for a rotation angle adjustment on the substrate 5.

Although in this embodiment the substrate rotation direction adjustment mechanism 16A is provided between the transfer stage 7A and the substrate 5, the position of the mechanism 16A is not limited as such. For example, the mechanism 16A may be provided under the embossment-roll-rotation-axis-direction moving mechanism 15.

Illumination light sources are provided in the substrate rotation direction adjustment mechanism 16A at positions corresponding to the respective alignment mark observation optical devices 21a–21d. On the other hand, the top surface of the pressurizing mechanism 2B is formed with observation windows 2B (2Ba–2Bd) through which to read, via the alignment mark observation optical devices 21a–21d, alignment marks that are provided on the front surface of the substrate 5 that is located under the resin thin film 4.

Next, the alignment marks will be described with reference to FIGS. 9A–9D. In the case of a color liquid crystal display device, as shown in FIGS. 9A and 9B, alignment marks 5a and 5b or 22 are provided to register a color filter layer (not shown) with the liquid crystal driving elements 31 that are formed on the substrate 5.

Figure 9A:
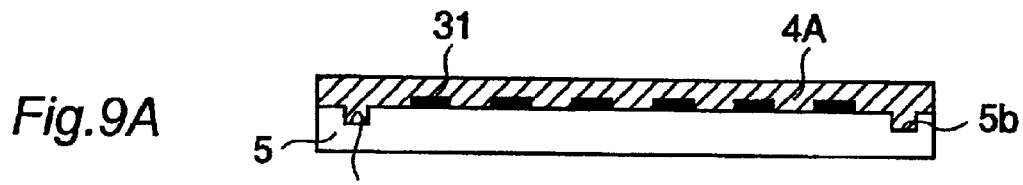
FIGS. 9A–9D illustrate the main part of a micro-asperity pattern forming apparatus according to an embodiment of the invention for forming an asperity pattern on a resin thin film in the case where a substrate having alignment marks used for liquid crystal driving elements under a reflection plate is used.

The structure of FIG. 9A is produced in the following manner. After recesses 5a and 5b as alignment marks are formed on the substrate 5, liquid crystal driving elements 31 such as TFTs are formed by repeating the steps of forming a metal film on the surface of the substrate 5 by sputtering, coating the metal film with a resist by spin coating, baking the resist at a high temperature to harden it, exposing the resist to ultraviolet light through a proper mask, removing exposed portions of the resist with a developer, again performing baking at a high temperature, etching away uncovered portions of the metal film, and removing the remaining portions of the resist with a remover. Finally, a resin thin film 4A is formed on the surface of the substrate 5 by spin coating. The resin film 4 fills the recesses 5a and 5b.

Figure 9B:
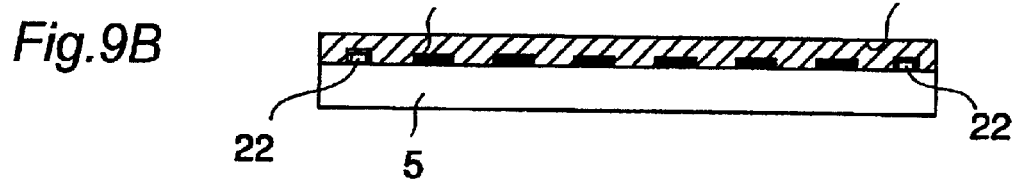

In the case of FIG. 9B, after alignment marks 22 and liquid crystal driving elements 31 such as TFTs are formed on the surface of the substrate 5 by the above-described method, a resin thin film 4B is formed on the surface of the substrate 5 by spin coating.

Figure 9C:
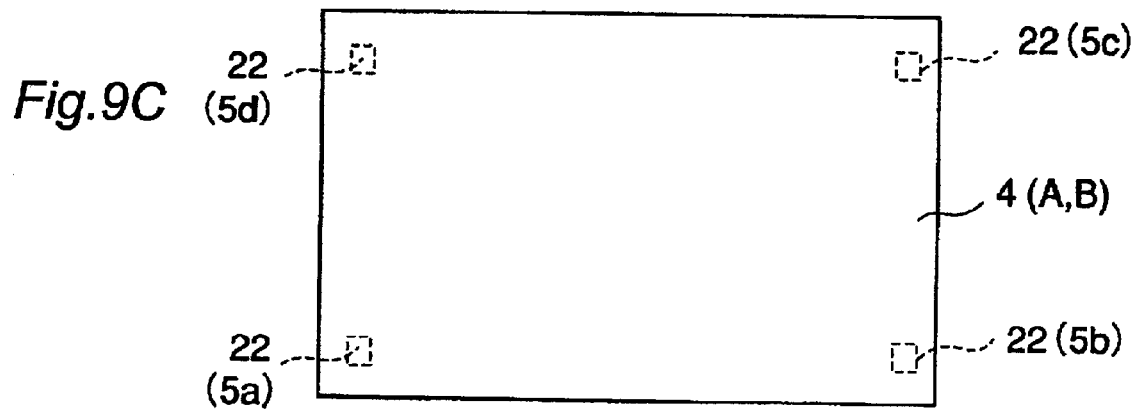
Figure 9D:
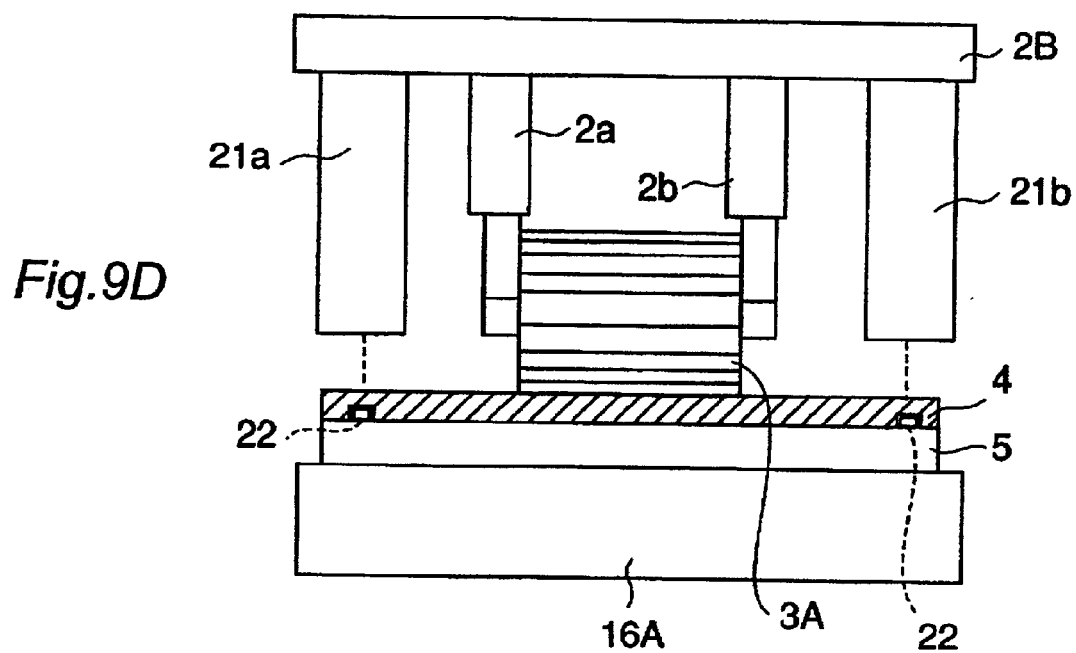

Accordingly, as shown in FIG. 9C, the alignment marks 22 or 5a–5d are arranged at the four corners of the resin thin film 4(4A, 4B). It is preferable that the alignment marks have a shape whose center can be easily recognized, such as cross, square, circle, or the like. FIG. 9D schematically shows the members located between the substrate rotation direction adjustment mechanism 16A and the pressurizing mechanism 2B as viewed from the right side in FIG. 8.

Next, the operation of the above-configured asperity pattern forming apparatus according to the seventh embodiment will be described with reference to FIG. 8.

Projection images of the alignment marks produced by the alignment mark observation devices 21a–21d are observed through the observation windows 2Ba–2Bd. If positions of the alignment marks that are formed on the substrate 5 deviate from reference positions of the alignment mark observation devices 21a–21d, movement adjustments are performed by the embossment-roll-rotation-axis-direction moving mechanism 15 and/or the substrate rotation direction adjustment mechanism 16A, whereby the deviations from the reference positions are made within a prescribed reference value.

Then, the transfer stage 7 is moved to a right-hand initial position. At the initial position, the pressurizing mechanism 2B is lowered to a prescribed position and the transfer stage 7 is moved leftward while the pressurizing mechanism 2 applies prescribed pressure to the resin thin film 4, whereby micro-asperity patterns 40a, 40b and 40c are formed.

After the first leftward movement of the transfer stage 7, the pressurizing mechanism 2B is elevated to the initial position, the moving mechanism 8A is moved to the viewer's side in FIG. 8 by a prescribed distance by the embossment-roll-rotation-axis-direction moving mechanism 15, and the transfer stage 7 is returned to the right-hand initial position. The pressurizing mechanism 2B is again lowered to the prescribed position and the transfer stage 7 is moved leftward while the pressurizing mechanism 2B applies the prescribed pressure to the resin thin film 4, whereby micro-asperity patterns 40d are formed.

In this embodiment, the four alignment mark observation optical devices 21a–21d are used. Alternatively, one or two alignment mark observation optical devices 21 may be used. In this case, position deviations of the alignment marks are determined by driving the embossment-roll-rotation-axis-direction moving mechanism 15 or the moving mechanism 8A and the deviations from the reference positions are made within the prescribed reference value by driving the substrate rotation direction adjustment mechanism 16A.

Although in this embodiment, the alignment marks are projected to the observation windows 2Ba–2Bd, they may be displayed on a monitor screen by using a CCD camera or the like.

The alignment marks may be formed by directly processing the substrate 5 itself by wet etching, dry etching, sand blasting, embossment, or the like. Alternatively, a thin film of a metal, an insulator, a resin, or the like may be formed on the surface of the substrate 5 by sputtering spin coating, evaporation, CVD, or the like and then processed by wet etching, dry etching, sand blasting, embossment, or the like.

In this embodiment, the alignment marks are formed on the surface of the substrate 5. Another configuration is possible in which alignment mark positions are formed, together with the asperity pattern, on the embossment roll 3 at positions distant from alignment marks of the embossment roll 3 and additional alignment marks corresponding to the alignment marks 5a and 5b or 22 are formed on the surface of the resin thin film 4 and observed with the alignment mark observation optical devices 21a–21d.

Figure 10:
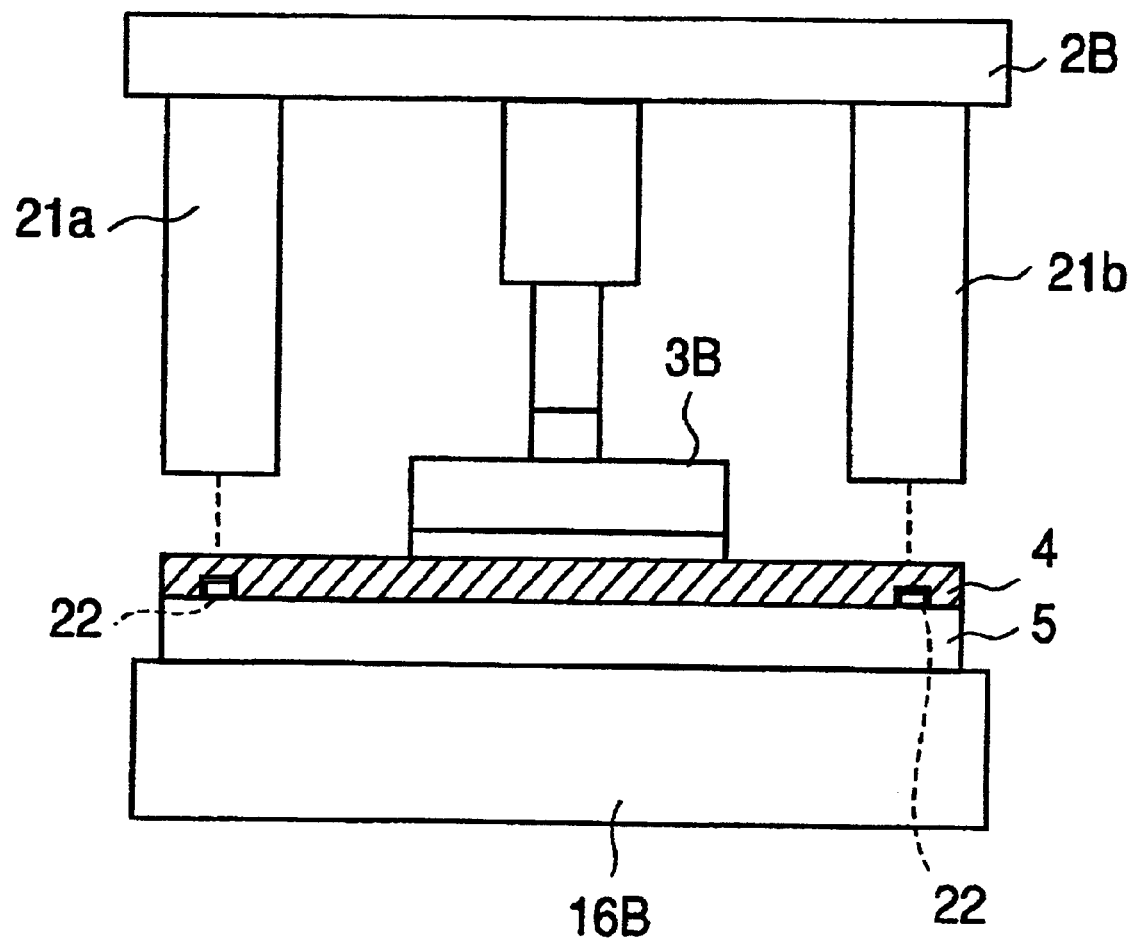
FIG. 10 illustrates the main part of a micro-asperity pattern forming apparatus according to another embodiment of the invention for forming an asperity pattern on a resin thin film in the case where a substrate having alignment marks used for liquid crystal driving elements under a reflection plate is used.

FIG. 10 shows a micro-asperity pattern forming apparatus according to another embodiment in which the embossment roll 3A is replaced by the stamper 3B used in the apparatus of FIG. 7. The other part of the configuration of the apparatus of FIG. 10 is the same as that of the apparatus of FIG. 7. Projection images of the alignment marks produced by the alignment mark observation devices 21a–21d are observed through the observation windows 2Ba–2Bd. If positions of the alignment marks that are formed on the substrate 5 deviate from reference positions of the alignment mark observation devices 21a–21d, movement adjustments are performed by the embossment-roll-rotation-axis-direction moving mechanism 15 and/or the substrate rotation direction adjustment mechanism 16B, whereby the deviations from the reference positions are made within a prescribed reference value.

Then, the transfer stage 7 is moved to a right-hand initial position. At the initial position, the pressurizing mechanism 2 is lowered to a prescribed position and applies prescribed pressure to the resin thin film 4. Then, the transfer stage 7 is moved leftward. In this manner, micro-asperity patterns 40a, 40b and 40c are formed.

After the first leftward movement of the transfer stage 7, the pressurizing mechanism 2 is elevated to the initial position, the moving mechanism 8A is moved to the viewer's side in FIG. 10 by a prescribed distance by the embossment-roll-rotation-axis-direction moving mechanism 15, and the transfer stage 7 is returned to the right-hand initial position. The pressurizing mechanism 2 is again lowered to the prescribed position and applies the prescribed pressure to the resin thin film 4, and the transfer stage 7 is moved leftward, to form a micro-asperity pattern 40d.

Figure 11:
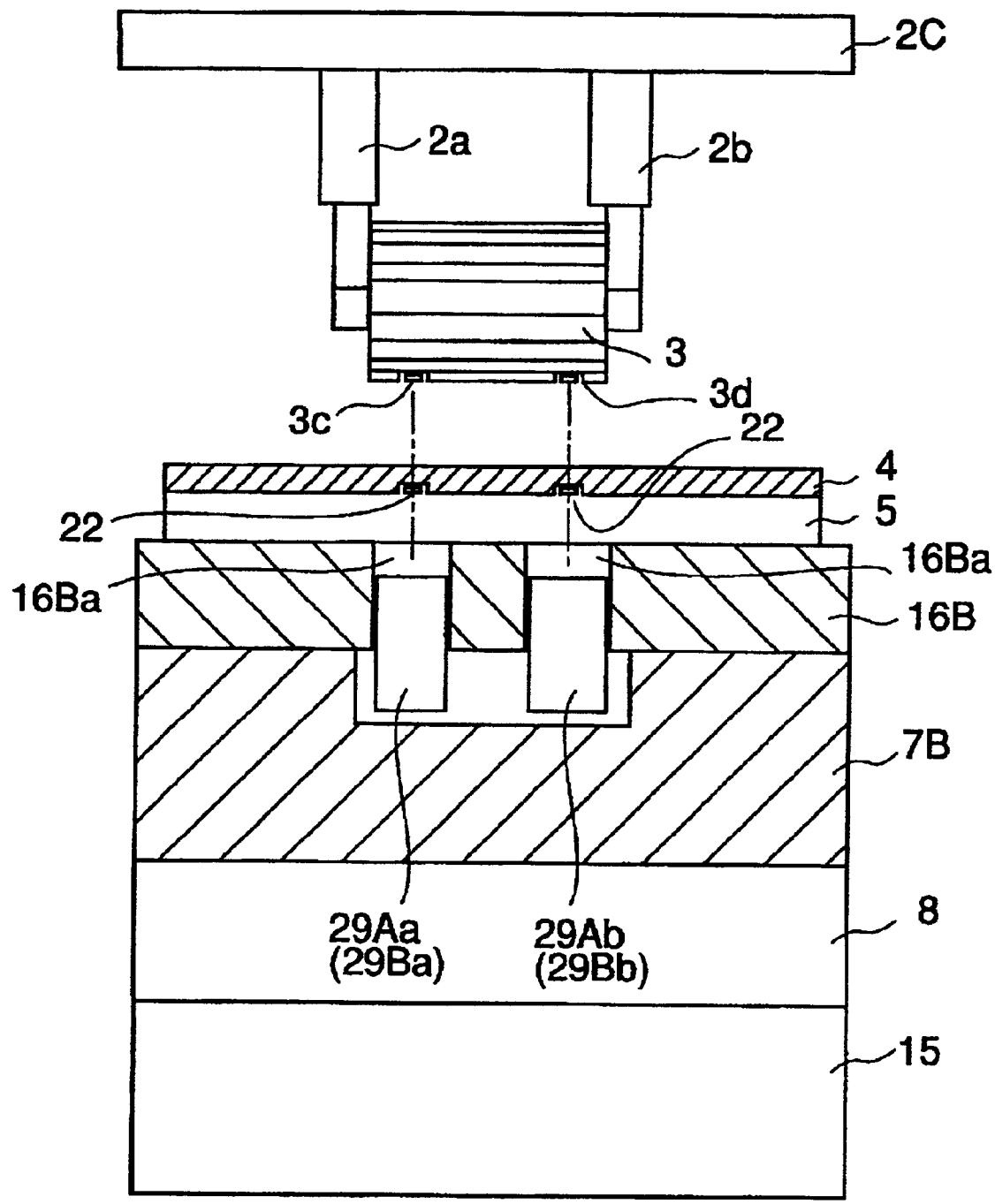
FIG. 11 illustrates the main part of a micro-asperity pattern forming apparatus having alignment mark observation devices under a reflection plate.
Figure 12A:
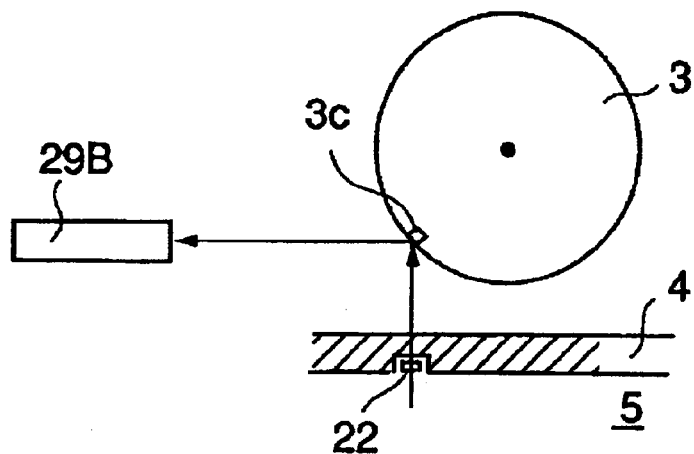
FIGS. 12A–12C illustrate how an alignment mark is observed with alignment mark observation devices.
Figure 12B:
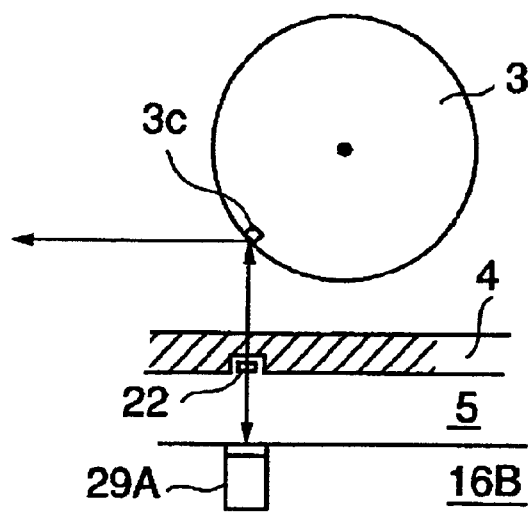
Figure 12C:
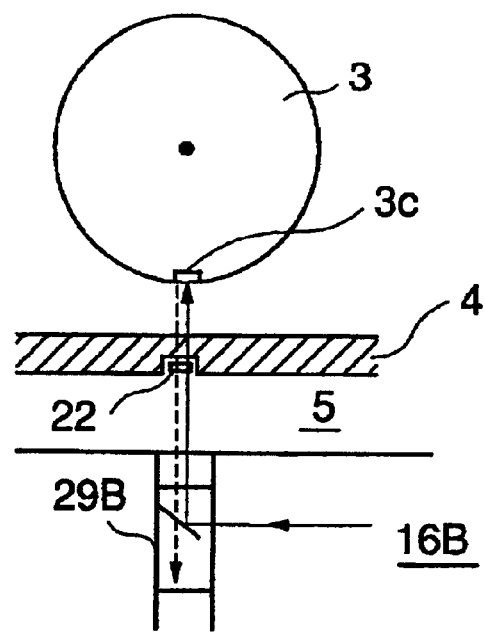

Next, a micro-asperity pattern forming apparatus according to another embodiment having alignment mark observation devices under a reflection plate will be described with reference to FIG. 11. Whereas the apparatus in FIG. 8 has the pressurizing mechanism 2B, the substrate rotation direction adjustment mechanism 16A, and the transfer stage 7A, the apparatus of FIG. 11 uses a pressurizing mechanism 2C, a substrate rotation direction adjustment mechanism 16B, and a transfer stage 7B. An embossment roll 3 that is held by the pressurizing mechanism 2C rotatably is provided with alignment marks 3c and 3d on the outer circumferential surface that is formed with a micro-asperity pattern. A substrate is held by the substrate rotation direction adjustment mechanism 16B. Through-holes 16Ba are formed in the substrate rotation direction adjustment mechanism 16B, and alignment mark observation optical devices 29Aa and 29Ab are provided in and held by the respective through-holes 16Ba. Photodetecting means are placed in the respective alignment mark observation optical devices 29Aa and 29Ab and connected to a monitor via a computer (not shown).

Where the alignment mark observation optical devices 29Aa and 29Ab have fields of view that are wider than an adjustment range, they may be held by the transfer stage 7B. Another configuration is possible in which an alignment mark observation optical device 29B is positioned so as to be able to view the alignment mark 3c on the outer circumferential surface of the embossment roll 3 as shown in FIG. 12A and the alignment mark observation optical device 29B detects light that comes via the substrate-5-side alignment mark 22. Still another configuration is possible in which an alignment mark observation optical device 29A is disposed under the substrate 5 as shown in FIG. 11 and detects light coming via the alignment mark 3c from outside the resin thin film 4 as shown in FIG. 12B. Yet another configuration is possible in which, as shown in FIG. 12C, the alignment mark 3c reflects light coming from an alignment mark observation device 29B via the alignment mark 22 that is located right over the alignment mark observation device 29B and then alignment mark observation device 29B detects resulting reflection light.

Next, the operation of the above-configured micro-asperity pattern forming apparatus will be described.

Projection images of the alignment marks 22 produced by the alignment mark observation devices 29Aa and 29Ab are observed with the above-mentioned monitor. If positions of the alignment marks 22 that are formed on the substrate 5 deviate from reference positions of the alignment mark observation devices 29Aa and 29Ab, movement adjustments are performed by the embossment-roll-rotation-axis-direction moving mechanism 15 and/or the substrate rotation direction adjustment mechanism 16B, whereby the deviations from the reference positions are made within a prescribed reference value.

Then, the transfer stage 7B is moved to an initial position. At the initial position, the pressurizing mechanism 2 is lowered to a prescribed position and the transfer stage 7B is moved while the pressuring mechanism 2 applies prescribed pressure to the resin thin film 4. An asperity pattern is formed as the embossment roll 3 rolls.

In this embodiment, the two alignment mark observation optical devices 29Aa and 29Ab are used. Alternatively, one or four alignment mark observation optical devices may be used. In this case, position deviations of the alignment marks are determined by driving the embossment-roll-rotation-axis-direction moving mechanism 15 or the moving mechanism 8 and the deviations from the reference positions are made within the prescribed reference value by driving the substrate rotation direction adjustment mechanism 16B.

Figure 13A:
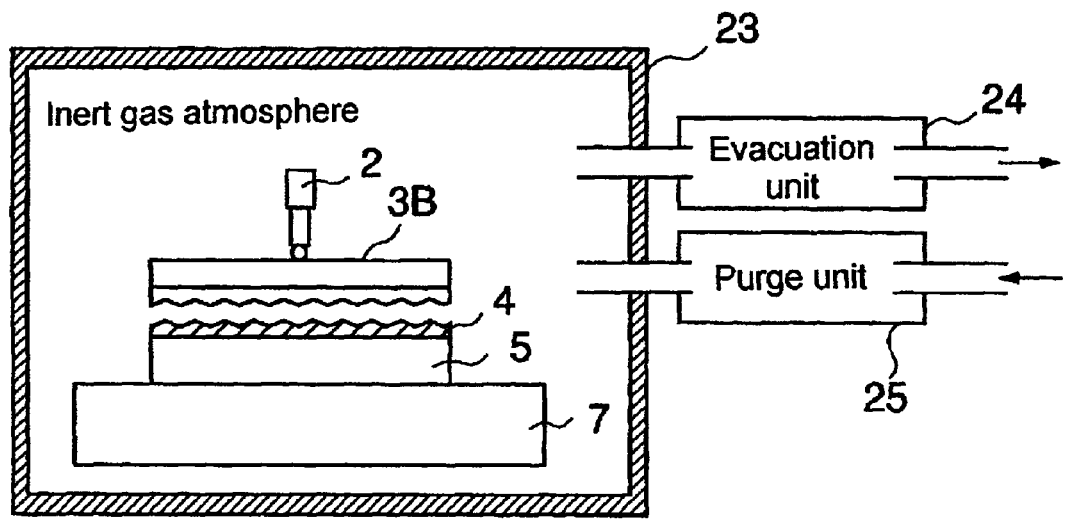
FIGS. 13A and 13B illustrate the main parts of micro-asperity pattern forming apparatuses for forming an asperity pattern on a resin thin film that are provided in an inert gas atmosphere.
Figure 13B:
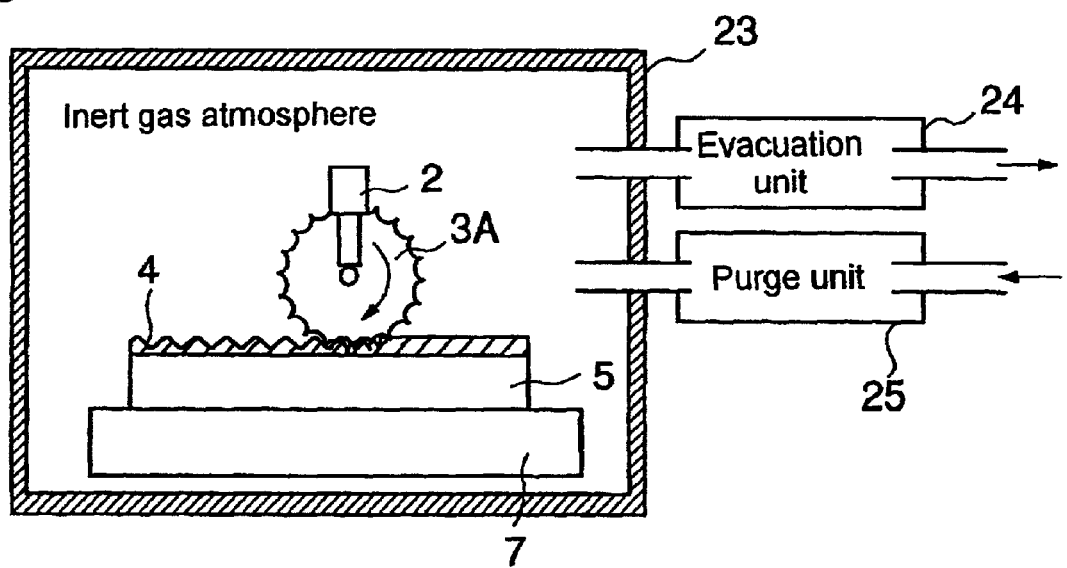

FIGS. 13A and 13B illustrate the main parts of micro-asperity pattern forming apparatuses according to other embodiments for forming an asperity pattern on a resin thin film that are provided in an inert gas atmosphere. As shown in FIGS. 13A and 13B, a transfer stage 7 is provided in an airtight chamber 23 and a substrate 5 that is coated with a resin thin film 4 is held by the transfer stage 7 in a detachable manner. A pressurizing mechanism 2 is provided above the resin thin film 4 so as to be movable in the vertical direction and the right-left direction. A stamper 3B (FIG. 13A) or an embossment roll 3A (FIG. 13B) is attached to the pressurizing mechanism 2 rotatably.

An evacuation unit 24 is connected to the chamber 23 to permit gas to escape from the chamber 23. Since the evacuation unit 24 is provided with a ventilation fan, a rotary pump, or the like, it can expel the gas from the chamber 23 to some extent. A purge unit 25 is also connected to the chamber 23 to supply a prescribed gas to the chamber 23. As a mechanism for supplying an inert gas such as $N_2$ or Ar to the chamber 23, a device for controlling the gas flow rate such as a mass flow controller or an APC valve is provided in the purge unit 25. The purge unit 25 is connected to a gas cylinder or a gas refining device as an inert gas supply source (not shown).

In the above-configured micro-asperity pattern forming apparatus according to this embodiment, the substrate 5 that is coated with the resin thin film 4 by spin coating is fixed to the transfer stage 7. Then, the evacuation unit 24 is caused to start operating, whereby the air is exhausted from the chamber 23. After the operation of the evacuation unit 24 is stopped, the purge unit 25 is caused to start operating, whereby an inert gas is introduced into the chamber 23. Then, the pressurizing mechanism 2 is moved rightward from a left-hand initial position in the chamber 23 while applying prescribed pressure to the resin thin film 4, whereby an asperity pattern is formed on the resin thin film 4.

In these embodiments, the air is exhausted from the chamber 23 in advance by the evacuation unit 24. Therefore, oxygen and impurities contained in the air inside the chamber 23 are exhausted and a micro-asperity pattern can be formed in a clean, inert gas atmosphere. This makes it possible to not only prevent the resin thin film 4 from being oxidized or changed in quality, but also prevent a phenomenon that impurities stick to the resin thin film 4 during formation of a micro-asperity pattern, and thus they are finally fixed to the micro-asperity pattern formed, whereby the production yield of an optical device can be increased.

Although in the embodiments, the pressurizing mechanism 2 is made movable in the right-left direction, it goes without saying that the transfer stage 7 may be moved by the moving mechanism 8 and the substrate rotation direction adjustment mechanism 16 may be used.

Figure 14A:
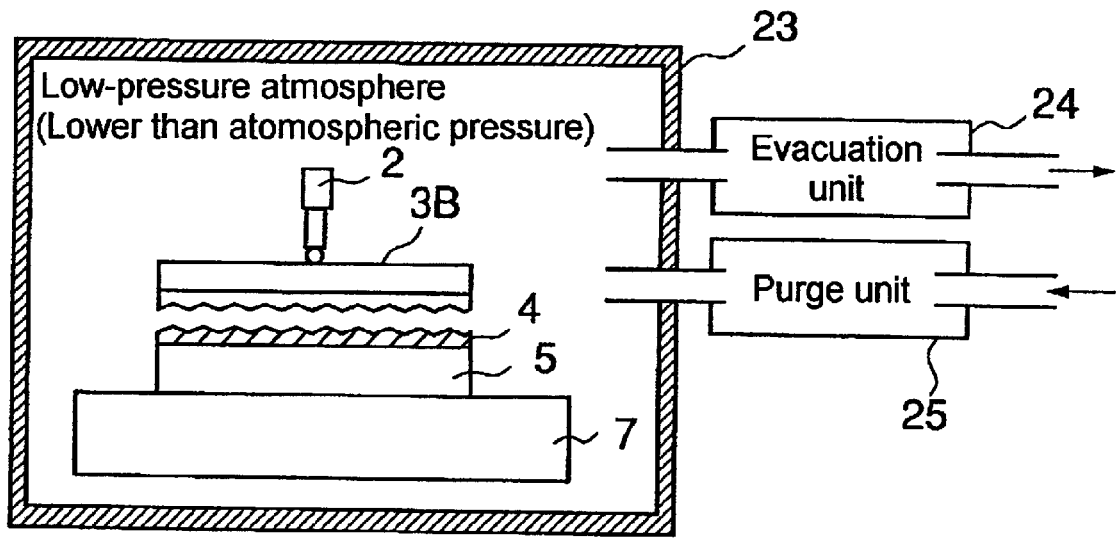
FIGS. 14A and 14B illustrate the main parts of micro-asperity pattern forming apparatuses for forming an asperity pattern on a resin thin film that are provided in a low-pressure atmosphere.
Figure 14B:
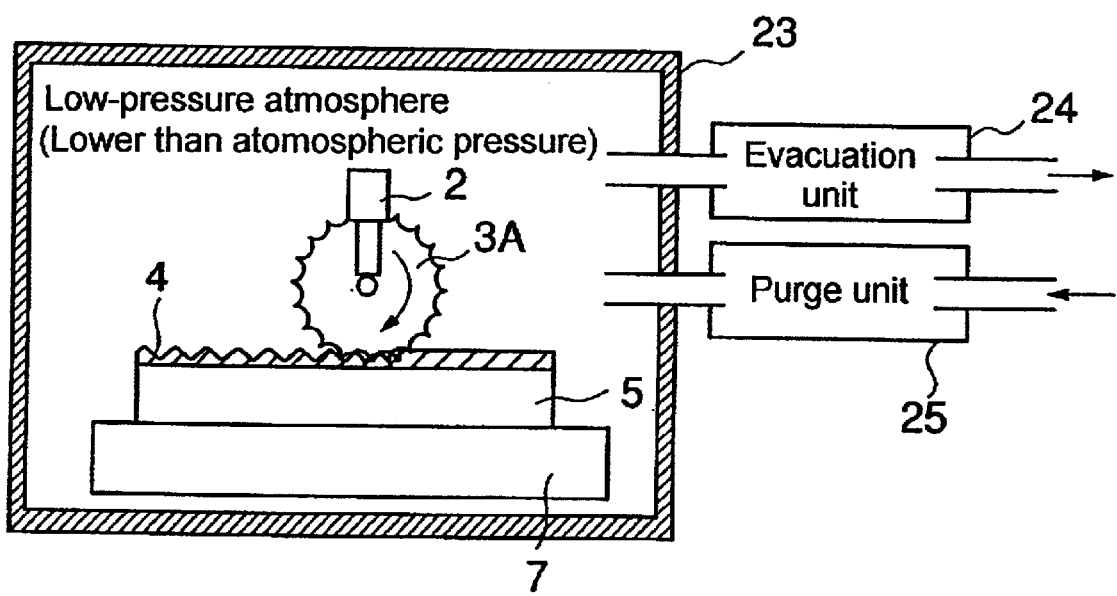

FIGS. 14A and 14B illustrate the main parts of micro-asperity pattern forming apparatuses according to other embodiments for forming an asperity pattern on a resin thin film that is provided in a low-pressure atmosphere. These embodiments are different from the embodiments of FIGS. 13A and 13B in that in the chamber 23, an optical device is manufactured in a low-pressure (lower than atmospheric pressure) atmosphere rather than in an inert gas atmosphere.

The evacuation unit 24 that is connected to the chamber 23 is provided with a rotary pump, a turbo pump, a diffusion pump, or the like so as to be able to exhaust a gas from the chamber 23 to establish a pressure of $10^{-3}$ to $10^{-7}$ torr inside the chamber 23. An inert gas such as $N_2$ or Ar may be supplied to the chamber 23 by the purge unit 25. Or an optical device may be manufactured without introducing an inert gas.

In these embodiments, the air is exhausted from the chamber 23 in advance by the evacuation unit 24. Therefore, oxygen and impurities contained in the air inside the chamber 23 are exhausted and a micro-asperity pattern can be formed in a clean, inert gas atmosphere.

Particularly, when the pressure inside the chamber 23 is lowered, water is easily evaporated and exhausted and hence air is no longer trapped between the die and the resin thin film 4. This prevents a phenomenon that impurities, vapor, etc. that suspend during formation of a micro-asperity pattern stick to the resin thin film 4, and thus they are finally fixed to the micro-asperity pattern formed.

Furthermore, the resin thin film 4 is prevented from being oxidized or changed in quality, and a micro-asperity pattern that is free of air bubbles can be formed. If air bubbles existed, they would act as a damper at the time of pressurization and hence necessitate stronger pressing force. Without air bubbles, the pressing force can be made weaker, which results in decrease of residual stress in a micro-asperity pattern. Therefore, the production yield of an optical device can be increased.

Figure 15:
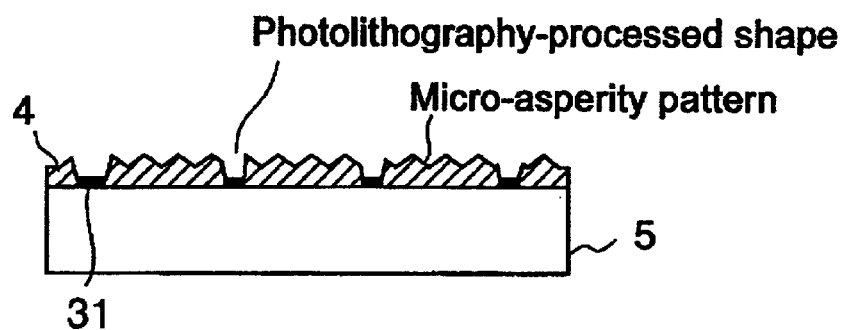
FIG. 15 shows a substrate that is provided with a resin thin film having a micro-asperity pattern.

According to any of the embodiments, a micro-asperity pattern can be formed on the resin thin film 4 that is formed on the substrate 5 as shown in FIG. 15. An optical device that is provided with the resin thin film 4 having the micro-asperity pattern thus formed can be used as a transparent diffraction grating substrate, a hologram, an optical storage medium such as an optical disc, a Fresnel lens, a micro-lens array, an optical waveguide, or the like by properly selecting an asperity pattern shape, a material of the resin thin film 4, a material of the substrate 5, etc.

Figure 16:
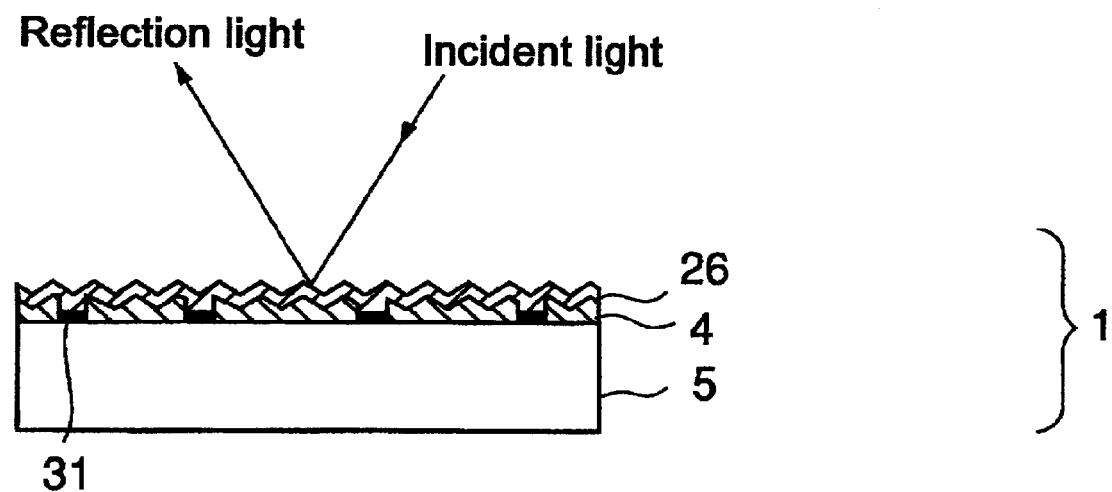
FIG. 16 shows a reflection plate in which a micro-asperity pattern is coated with a reflection film.

A reflection plate shown in FIG. 16 can be manufactured by forming a reflection film 26 by depositing a high reflectivity material such as Al, Ag, an Al alloy, or an Ag alloy on the micro-asperity pattern surface of the above substrate at a thickness of about 2,000 Å by sputtering, evaporation, or the like.

In this case, the adhesiveness between the resin thin film 4 and the reflection film 26 can be increased by laying an intermediate film made of Tr, Cr, Si, or the like between the resin thin film 4 and the reflection film 26, that is, by forming the reflection film 26 after coating the micro-asperity pattern surface with the intermediate film.

The above reflection plate can be used as an optical device such as a hologram, Fresnel mirror, or micro-mirror array. The above reflection plate can be used as an electrode substrate of a liquid crystal display device of an STN type or the like by forming a metal thin film as the reflection film 26 and planarizing and sealing the metal thin film by spin-coating its surface with an insulating film such as a transparent resin thin film or polyimide, acrylic resin, or the like.

Figure 17:
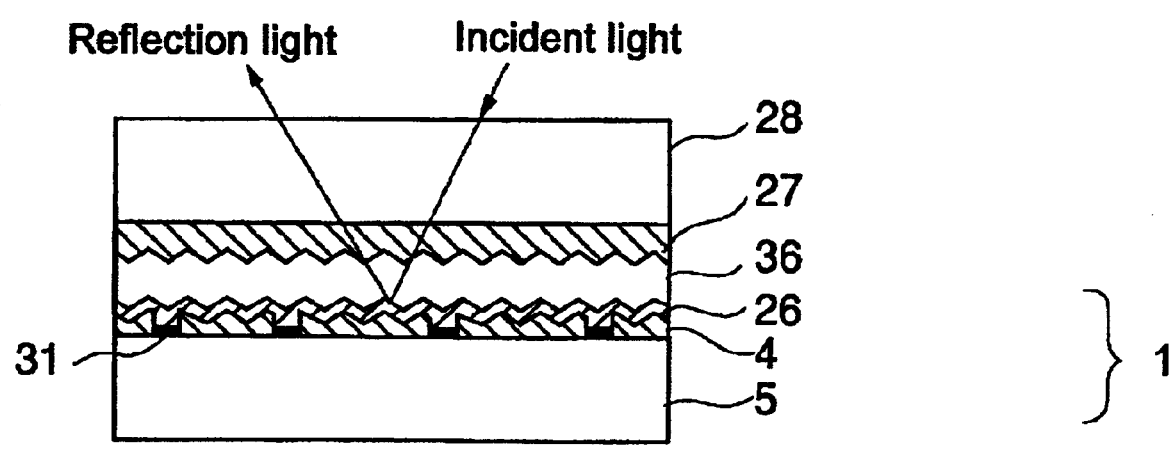
FIG. 17 shows a liquid crystal display device according to an embodiment.

FIG. 17 shows a liquid crystal display device according to an embodiment of the invention. A substrate 5 is made of non-alkali glass or a highly heat-resistant resin. Liquid crystal driving elements 31 such as TFTs are formed by a semiconductor fabricating process on the surface of the substrate 5.

The resin thin film 4 is formed by spin-coating a highly heat-resistant material such as polyimide resin having a glass-transition temperature sufficiently higher than 200° C. The resin thin film 4 requires a glass-transition temperature similar to or higher than that of the substrate 5 on which the liquid crystal driving elements 31 are formed in order to form the reflection film 26 by depositing a high reflectivity material such as Al, Ag, an Al alloy, an Ag alloy, or the like by sputtering, evaporation, or the like after the micro-asperity pattern of the resin thin film 4 is formed. The above-mentioned highly heat-resistant material such as polyimide resin or the like is spin-coated on the reflection film 26 to be used as a transparent insulating alignment film. It is possible to increase light transmissivity by adjusting the thickness of the reflection film 26, and a reflection-type liquid crystal display device can be manufactured.

The reflection plate according to this embodiment can be used in not only the reflection-type liquid crystal display device but also other reflection-type display devices. Although not shown in any drawings, the reflection plate can also be used as what is called a semi-transmission-type liquid crystal display device in which the power consumption of the backlight light source is set low or incident light is introduced through a member other than the liquid crystal panel.

Although the reflection plate is a front-surface-reflection-type reflection plate in which the micro-asperity pattern is formed on the front surface of the reflection plate and incident light is reflected by the surfaces of asperities, the invention can also be applied to a back-surface-reflection-type reflection plate in which a glass or transparent resin substrate is used and incident light is reflected by a micro-asperity pattern that is formed on the back surface of the substrate.

The reflection-type liquid crystal display device having the above-configured reflection plate 1, can be used as a display of electronic equipment such as cellular phones and low-power-consumption-type radio equipment. It goes without saying that the reflection plate can be used not only in such electronic equipment but also in portable information terminal, such as PDAs, portable computers and portable TV receivers.

As described above, according to the present invention, the micro-asperity pattern surface of the die is pressed against the surface of the resin thin film. Accordingly, the surface of the resin thin film can be provided with the micro-asperity pattern in a three-dimensional shape with a high degree of freedom and with high reproducibility. Since the temperature of the photosensitive resin thin film coated on the substrate is controlled to a temperature lower than the photosensitivity extinction temperature, formation of a through-hole or cutting of the shape of the resin thin film can be easily performed by photolithography. This can provide optical device products having accurate a micro-asperity pattern.

What is claimed is:

1. A manufacturing method of an optical device, comprising:

coating a substrate with a resin thin film made of a photosensitive resin; controlling a temperature of the resin thin film to a temperature that is lower than the photosensitivity extinction temperature, of the resin thin film so as to soften or melt the resin thin film; and pressing a die having an inverted micro-asperity pattern against the resin thin film in a state that the resin thin film has been softened or melted, whereby a micro-asperity pattern is formed on a surface of the resin thin film.

2. The manufacturing method according to claim 1, wherein the die pressing step is repeated a plurality of times on the resin thin film.

3. The manufacturing method according to claim 1, further comprising making adjustments by causing a relative movement between the substrate and the die so that a substrate-side alignment mark provided on the substrate coincides with a reference position on the die side.

4. The manufacturing method according to claim 1, wherein the micro-asperity pattern is formed on the surface of the resin thin film in an inert gas atmosphere.

5. The manufacturing method according to claim 1, wherein the micro-asperity pattern is formed on the surface of the resin thin film in a low-pressure atmosphere that is lower than atmospheric pressure.

6. The manufacturing method according to claim 1, wherein the resin thin film comprises polyimide or acrylic resin.

7. A manufacturing method of an optical device, comprising the steps of:

coating a substrate with a photosensitive resin thin film;

controlling a temperature of the resin thin film to a temperature that is lower than the photosensitivity extinction temperature of the resin thin film, so as to soften or melt the resin thin film;

pressing a die having an inverted micro-asperity pattern against the resin thin film when the resin thin film is in a softened or melted state, whereby the micro-asperity pattern is formed on a surface of the resin thin film;

forming a through-hole leading from the surface of the micro-asperity pattern to the surface of the substrate by photolithography; and sintering the resin thin film at a temperature that is higher than the photosensitivity extinction temperature of the resin thin film.

8. A manufacturing method of a reflection plate, comprising the steps of:

coating a substrate on which thin-film liquid crystal driving elements or wiring contacts are formed with a photosensitive resin thin film;

controlling a temperature of the resin thin film to a temperature that is lower than the photosensitivity extinction temperature of the resin thin film, so as to soften or melt the resin thin film;

pressing a die having an inverted micro-asperity pattern against the resin thin film when the resin thin film is in a softened or melted state, whereby the micro-asperity pattern is formed on a surface of the resin thin film;

forming a through-hole leading from the surface of the micro-asperity pattern to the thin-film liquid crystal driving elements or wiring contacts by photolithography;

forming a reflection film on the inner surface of the through-hole and the surface of the micro-asperity pattern; and sintering the resin thin film at a temperature that is higher than the photosensitivity extinction temperature of the resin thin film.

* * * * *